US012311291B2

(12) United States Patent
Reckin et al.

(10) Patent No.: US 12,311,291 B2
(45) Date of Patent: May 27, 2025

(54) WATER FILTRATION SYSTEM AND METHOD

(71) Applicant: Pentair Residential Filtration, LLC, Glendale, WI (US)

(72) Inventors: Richard Reckin, Glendale, WI (US); Tedd M. Schneidewend, Milwaukee, WI (US)

(73) Assignee: Pentair Residential Filtration, LLC, Glendale, WI (US)

( * ) Notice: Subject to any disclaimer, the term of this patent is extended or adjusted under 35 U.S.C. 154(b) by 338 days.

(21) Appl. No.: 18/146,906

(22) Filed: Dec. 27, 2022

(65) Prior Publication Data
US 2023/0139571 A1 May 4, 2023

Related U.S. Application Data

(63) Continuation of application No. 15/786,477, filed on Oct. 17, 2017, now Pat. No. 11,534,704, which is a
(Continued)

(51) Int. Cl.
*B01D 27/08* (2006.01)
*B01D 35/153* (2006.01)
(Continued)

(52) U.S. Cl.
CPC ........... *B01D 27/08* (2013.01); *B01D 35/153* (2013.01); *B01D 27/106* (2013.01); *B01D 35/30* (2013.01);
(Continued)

(58) Field of Classification Search
CPC .... B01D 27/08; B01D 27/106; B01D 35/153; B01D 35/30; B01D 2201/303;
(Continued)

(56) References Cited

U.S. PATENT DOCUMENTS 3,289,847 A 12/1966 Rothemund
3,399,776 A 9/1968 Knuth
(Continued)

FOREIGN PATENT DOCUMENTS

DE 2458784 A1 6/1976
DE 2719875 A1 11/1978
(Continued)

OTHER PUBLICATIONS

State Intellectual Property Office of the People's Republic of China; Notification of the First Office Action (PCT Application in the National Phase); Date of Notification: Nov. 30, 2016; 7 pages.
(Continued)

*Primary Examiner* — Patrick Orme
(74) *Attorney, Agent, or Firm* — Husch Blackwell LLP

(57) ABSTRACT

A modular water filtration system including a filter manifold and a filter cartridge is provided. The filter manifold includes a body, a first arm member, a second arm member, a brace, and a slot positioned on the brace. The filter cartridge includes a cartridge head and a fin member protruding upwardly from the cartridge head, and the fin member is sized to be received within the slot of the filter manifold. The filter cartridge is adapted to engage the filter manifold through a horizontal force when the fin member is aligned with the slot.

20 Claims, 38 Drawing Sheets

Related U.S. Application Data continuation of application No. 14/316,386, filed on Jun. 26, 2014, now Pat. No. 9,789,424.

(60) Provisional application No. 61/839,747, filed on Jun. 26, 2013.

(51) Int. Cl.
  *B01D 35/30* (2006.01)
  *C02F 1/00* (2023.01)
  B01D 27/10 (2006.01)
  C02F 1/28 (2023.01)
  C02F 1/44 (2023.01)

(52) U.S. Cl.
  CPC .......... *B01D 2201/303* (2013.01); *B01D 2201/4023* (2013.01); *B01D 2201/4053* (2013.01); *B01D 2201/4061* (2013.01); *C02F 1/003* (2013.01); *C02F 1/283* (2013.01); *C02F 1/441* (2013.01); *C02F 2201/006* (2013.01); *C02F 2307/10* (2013.01)

(58) Field of Classification Search
  CPC .... B01D 2201/4023; B01D 2201/4053; B01D 2201/4061; C02F 1/003; C02F 1/283; C02F 1/441; C02F 2201/006; C02F 2307/10
  See application file for complete search history.

(56) References Cited

U.S. PATENT DOCUMENTS

| | | |
|---|---|---|
| 3,493,115 A | 2/1970 | Koches |
| D220,263 S | 3/1971 | Hughes |
| 3,746,171 A | 7/1973 | Thomsen |
| 3,950,251 A | 4/1976 | Hiller |
| 3,970,284 A | 7/1976 | Cobbe, Jr. |
| 4,379,053 A | 4/1983 | Brane |
| 4,515,692 A | 5/1985 | Chandler et al. |
| 4,645,601 A | 2/1987 | Regunathan et al. |
| 4,735,716 A | 4/1988 | Petrucci et al. |
| 4,806,240 A | 2/1989 | Giordano et al. |
| 4,818,397 A | 4/1989 | Joy |
| 4,857,189 A | 8/1989 | Thomsen et al. |
| 4,857,191 A | 8/1989 | Wolf |
| 4,877,521 A | 10/1989 | Petrucci et al. |
| 4,915,831 A | 4/1990 | Taylor |
| 4,923,601 A | 5/1990 | Drori |
| 4,948,505 A | 8/1990 | Petrucci et al. |
| 4,956,086 A | 9/1990 | Thomsen et al. |
| 5,013,434 A | 5/1991 | Furrow |
| 5,108,598 A | 4/1992 | Posner |
| 5,126,044 A | 6/1992 | Magnusson et al. |
| 5,215,655 A | 6/1993 | Mittermaier |
| 5,269,919 A | 12/1993 | von Medlin |
| 5,316,347 A | 5/1994 | Arosio |
| 5,328,609 A | 7/1994 | Magnusson et al. |
| 5,334,309 A | 8/1994 | Huggett et al. |
| 5,336,406 A | 8/1994 | Stanford et al. |
| 5,354,464 A | 10/1994 | Slovak et al. |
| D357,058 S | 4/1995 | Engelhard |
| 5,486,288 A | 1/1996 | Stanford et al. |
| 5,507,530 A | 4/1996 | Mahaney |
| 5,548,893 A | 8/1996 | Koelfgen |
| 5,562,824 A | 10/1996 | Magnusson |
| 5,591,332 A | 1/1997 | Reid et al. |
| 5,653,871 A | 8/1997 | Thomsen |
| 5,744,030 A | 4/1998 | Reid et al. |
| 5,753,107 A | 5/1998 | Magnusson et al. |
| 5,762,787 A | 6/1998 | Park et al. |
| 5,782,171 A | 7/1998 | Crain et al. |
| 5,826,854 A | 10/1998 | Janvrin et al. |
| 6,027,644 A | 2/2000 | Magnusson et al. |
| 6,068,770 A | 5/2000 | Niermeyer et al. |
| 6,120,685 A | 9/2000 | Carlson et al. |
| D433,094 S | 10/2000 | Magnusson et al. |
| 6,193,884 B1 | 2/2001 | Magnusson et al. |
| 6,303,031 B1 | 10/2001 | Senner |
| 6,325,929 B1 | 12/2001 | Bassett |
| 6,360,764 B1 | 3/2002 | Fritze |
| D455,814 S | 4/2002 | Magnusson et al. |
| 6,378,907 B1 | 4/2002 | Campbell et al. |
| 6,443,498 B1 | 9/2002 | Liao |
| 6,458,269 B1 | 10/2002 | Bassett et al. |
| D481,441 S | 10/2003 | Liu |
| 6,632,355 B2 | 10/2003 | Fritze |
| 6,776,906 B2 | 8/2004 | Reid |
| 6,926,826 B2 | 8/2005 | Reid |
| 7,000,894 B2 | 2/2006 | Olson et al. |
| 7,021,667 B2 | 4/2006 | Campbell et al. |
| 7,093,721 B2 | 8/2006 | Imanse et al. |
| 7,138,052 B2 | 11/2006 | Reid |
| 7,147,772 B2 | 12/2006 | Fritze |
| 7,172,693 B2 | 2/2007 | Reid |
| 7,182,858 B2 | 2/2007 | Brown et al. |
| 7,186,337 B2 | 3/2007 | Reid |
| 7,186,338 B2 | 3/2007 | Boisvert |
| 7,195,122 B2 | 3/2007 | Hiranaga et al. |
| D547,823 S | 7/2007 | Kennedy et al. |
| D548,306 S | 8/2007 | Kennedy et al. |
| 7,264,718 B2 | 9/2007 | Knoll et al. |
| D554,734 S | 11/2007 | Yamamoto |
| D555,225 S | 11/2007 | McCormack et al. |
| 7,296,582 B2 | 11/2007 | Campbell et al. |
| 7,338,599 B2 | 3/2008 | Hiranga et al. |
| 7,387,210 B2 | 6/2008 | Burrows et al. |
| 7,476,315 B2 | 1/2009 | Reid |
| 7,481,928 B2 | 1/2009 | Fritze |
| 7,578,936 B2 | 8/2009 | Gaignet et al. |
| 7,651,070 B2 | 1/2010 | Ruprecht |
| 7,658,840 B2 | 2/2010 | Lisenko |
| 7,662,283 B2 | 2/2010 | Eserkain et al. |
| 7,736,503 B2 | 6/2010 | Kennedy et al. |
| 7,744,757 B1 | 6/2010 | Liao |
| 7,763,170 B2 | 7/2010 | Bassett et al. |
| 7,799,220 B2 | 9/2010 | Fritze |
| 7,909,999 B2 | 3/2011 | Noh et al. |
| 7,967,981 B2 | 6/2011 | Talamali |
| 8,097,156 B2 | 1/2012 | Tubby et al. |
| 8,137,551 B1 | 3/2012 | Huda et al. |
| 8,182,699 B2 | 5/2012 | Fritze |
| 8,398,852 B2 | 3/2013 | Burrows |
| D679,779 S | 4/2013 | Reid |
| 8,911,623 B2 | 12/2014 | Tubby et al. |
| 9,044,699 B2 | 6/2015 | Gale et al. |
| 9,789,424 B2 | 10/2017 | Reckin et al. |
| 2003/0019819 A1 | 1/2003 | Fritze |
| 2003/0217958 A1* | 11/2003 | Reid .................. B01D 35/301 210/232 |
| 2004/0211931 A1 | 10/2004 | Olson et al. |
| 2005/0167352 A1* | 8/2005 | Burrows .................. C02F 9/20 210/241 |
| 2005/0173323 A1 | 8/2005 | Meuleners et al. |
| 2007/0000829 A1 | 1/2007 | Boisvert |
| 2007/0199876 A1* | 8/2007 | Tubby .................. B01D 35/147 210/232 |
| 2007/0227959 A1 | 10/2007 | Sinur et al. |
| 2007/0295667 A1 | 12/2007 | Ruprecht |
| 2008/0156711 A1 | 7/2008 | Vitan et al. |
| 2008/0185330 A1 | 8/2008 | Sinur et al. |
| 2009/0173683 A1 | 7/2009 | Burrows |
| 2009/0236271 A1 | 9/2009 | Eserkaln et al. |
| 2010/0000929 A1 | 1/2010 | Gaignet et al. |
| 2010/0089812 A1 | 4/2010 | Talamali |
| 2010/0140153 A1 | 6/2010 | Telepciak et al. |
| 2011/0247974 A1 | 10/2011 | Gale et al. |
| 2012/0055866 A1 | 3/2012 | Lin |
| 2012/0211412 A1 | 8/2012 | Tubby et al. |
| 2012/0223002 A1 | 9/2012 | Lin |

(56) References Cited

U.S. PATENT DOCUMENTS

FOREIGN PATENT DOCUMENTS

| DE | 102009041523 A1 | 3/2011 |
|---|---|---|
| GB | 1566502 A | 4/1980 |
| JP | 60153913 A | 8/1985 |
| JP | 2000325712 A | 11/2000 |
| JP | 2004024955 A | 1/2004 |
| WO | 2004028661 A1 | 4/2004 |
| WO | 2006094065 A2 | 9/2006 |

OTHER PUBLICATIONS

International Search Report and Written Opinion of the International Searching Authority issued in PCT Application No. PCT/US14/44418; Dated Dec. 9, 2014; 17 pages.
Extended European Search Report, European Application No. 14817458.4, dated Apr. 25, 2017, 10 pages.
Communication Pursuant to Article 94(3) EPC, European Application No. 14817458.4, dated Mar. 9, 2020, 8 pages.

* cited by examiner

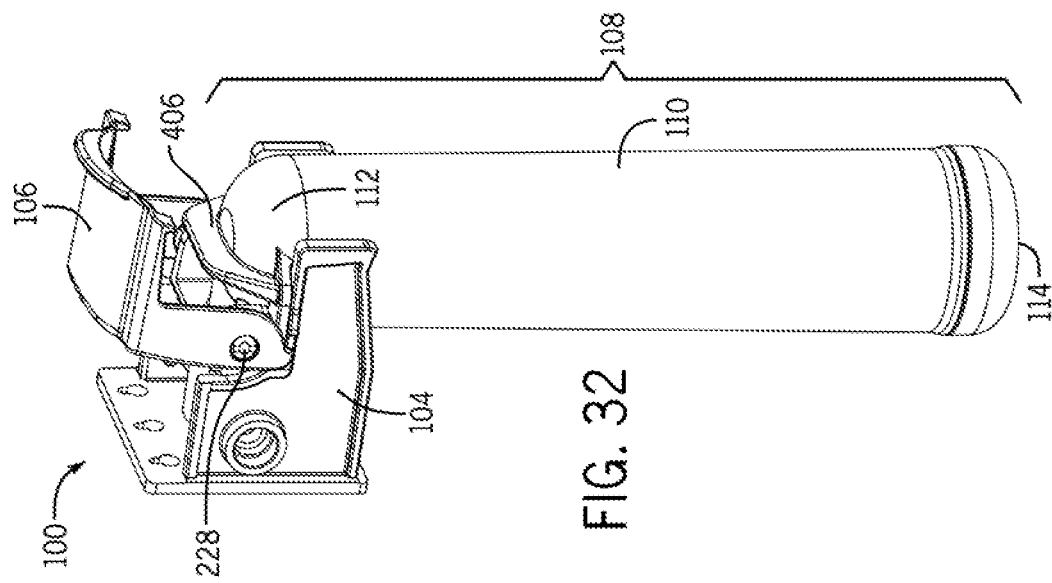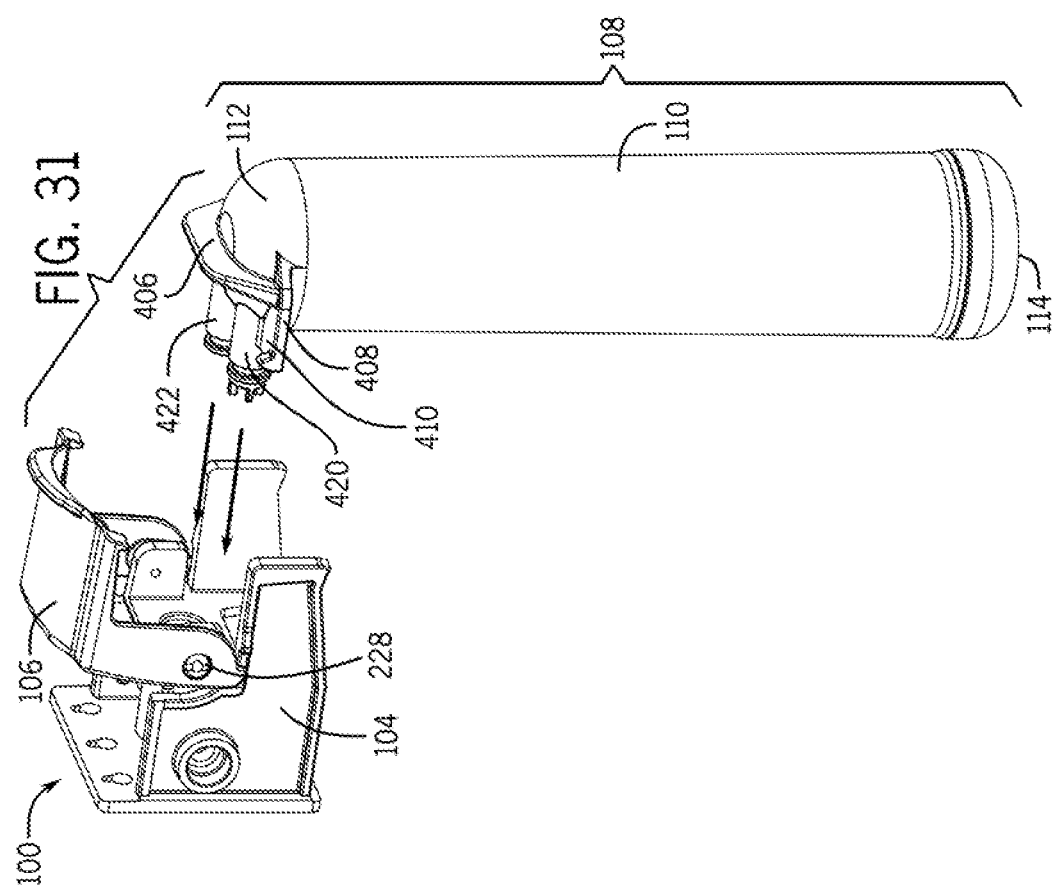

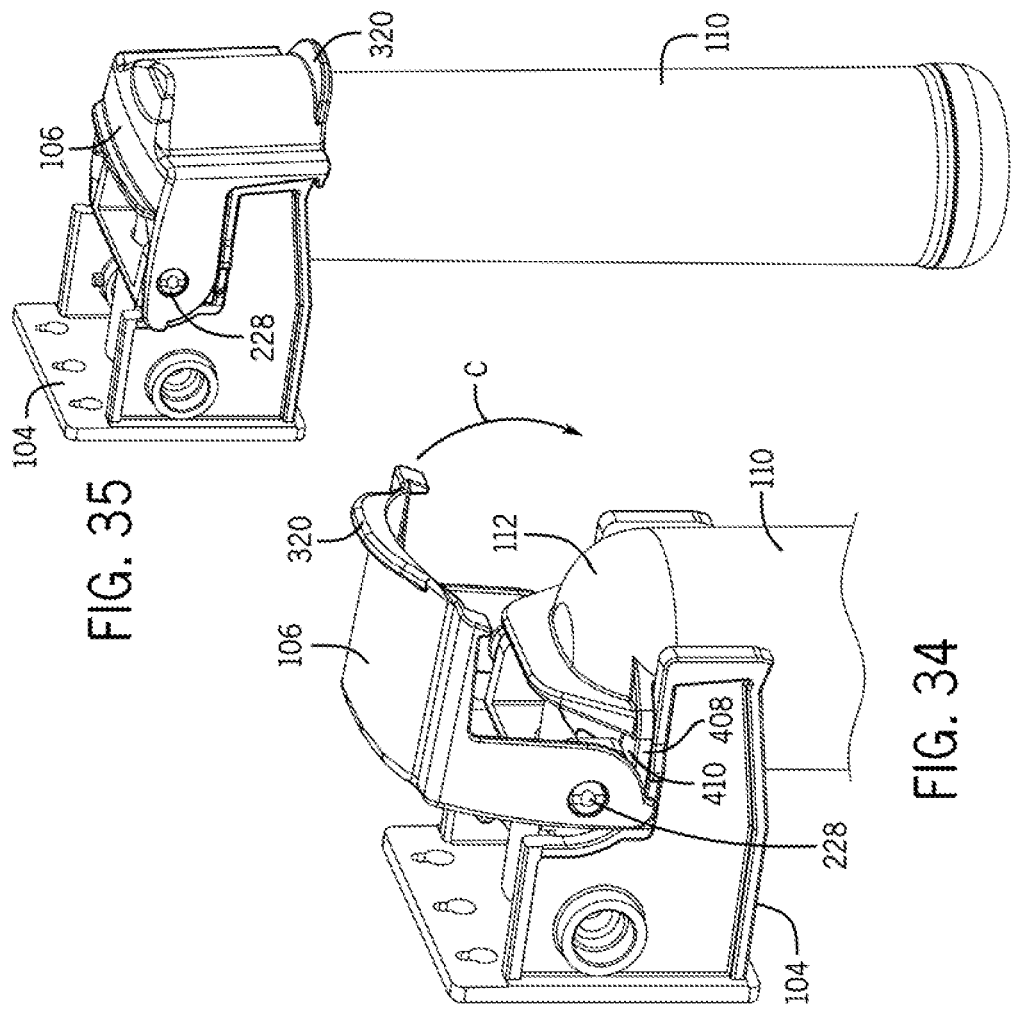
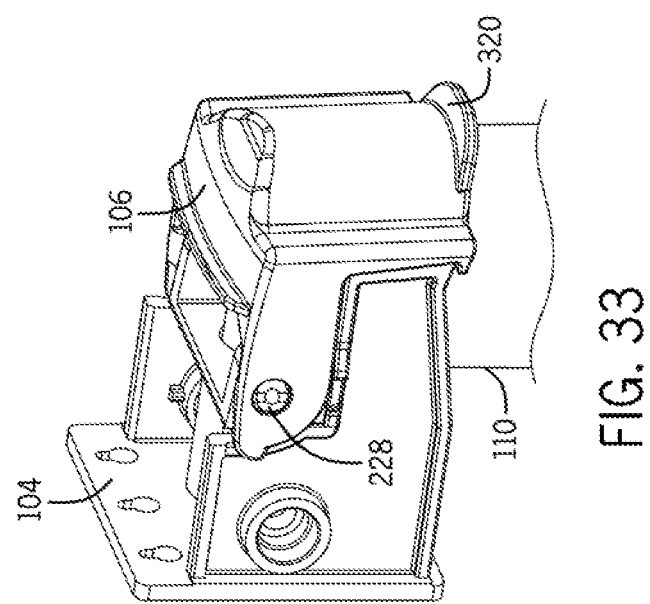

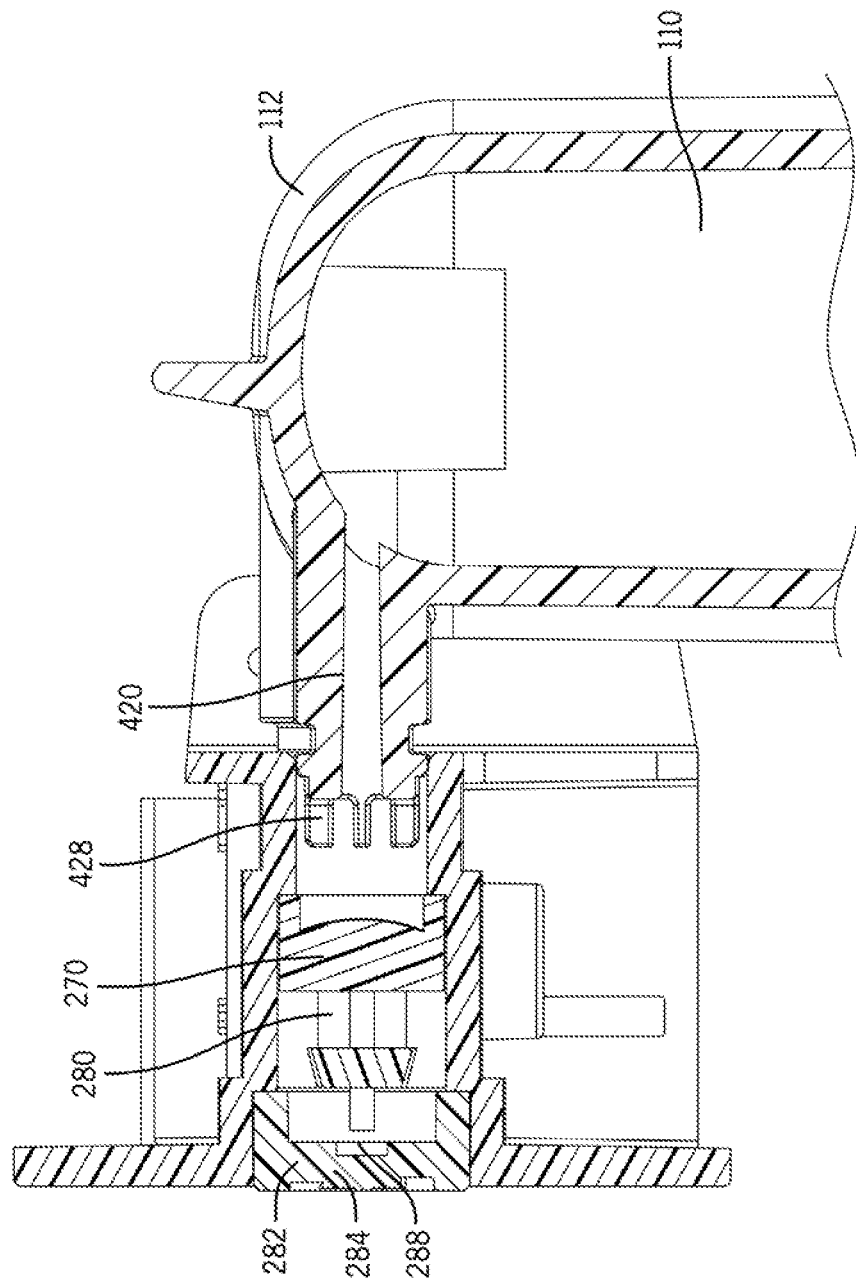

WATER FILTRATION SYSTEM AND METHOD

CROSS REFERENCE TO RELATED APPLICATIONS

This application is a continuation of U.S. patent application Ser. No. 15/786,477 filed on Oct. 17, 2017, which is a continuation of U.S. patent application Ser. No. 14/316,386 filed on Jun. 26, 2014, which claims the benefit of U.S. Provisional Patent Application No. 61/839,747 filed on Jun. 26, 2013. The contents of the foregoing applications are incorporated herein by reference in their entirety.

BACKGROUND

Water filtration systems are frequently used in a variety of settings including residential and commercial applications in which the systems are designed to remove contaminants and other impurities from the water supply to provide filtered water. To that end, water quality varies drastically globally and requires unique filtration parameters tailored to the specific properties of the water being filtered and the desired level of filtration required by the end user.

Water filtration systems usually include a filter cartridge coupled to a manifold, which are usually installed in any number of locations in the water supply line. For example, a water filtration system may be installed in a refrigerator in communication with a built-in water dispenser. Additionally, a water filtration system may be installed under a countertop that supports a sink and/or faucet. Alternatively, or in addition to, a water filtration system may be employed on the faucet itself. Finally, other types of water filtration systems may be utilized at some other point in the water supply between the main water line that supplies water from a municipal or city water source to the end dispensing point (e.g., a faucet, water dispenser, etc.).

In many instances, water filtration systems utilize a changeable and disposable filter cartridge when the filter cartridge has reached the end of its operable life. At this point, the filter cartridge must be disengaged from the system and replaced with a new filter cartridge. The entire used filter cartridge is disposed of after the new filter cartridge has been installed.

There are many obstacles associated with some existing water filtration systems and the cartridge removal and replacement process. For example, many filter cartridges engage with the system via a vertical engagement mechanism, whereby the filter cartridge must be pulled downwardly with respect to the manifold to remove the filter cartridge. Vertical disengagement is problematic in many instances due to clearance and space constraints within the refrigerator, under the sink, or in other confined areas, which makes the filter replacement procedure difficult. Additionally, the disposal of the entire spent filter cartridge is also undesirable due to the increased cost to the consumer purchasing the filter cartridge and because of the harm caused to the environment due to the increase in waste.

Some water filtration systems have attempted to address these deficiencies by providing a reusable cartridge. However, these cartridges frequently include one or more portions that are fixed to the manifold, which decreases the ease of media replacement in the filter cartridge and increases water spillage. In particular, a cartridge head is frequently joined to the manifold with the filter cartridge being threadingly engaged to the cartridge head. In this instance, the person changing the cartridge must disengage the filter cartridge by rotating the cartridge and removing it from the cartridge head. The disengagement at the point of attachment between the cartridge head and the filter cartridge is inconvenient due to space constraints and leads to more spillage during the replacement procedure due to leakage at the point of disengagement.

One known water filtration system provides a filtering device that includes a cartridge head permanently installed in a fluid dispensing machine and a corresponding disposable canister. A central chamber is formed in the cartridge head, and the chamber is in communication with an inlet port and an outlet port for receiving an unfiltered liquid and supplying a filtered liquid, respectively. The disposable canister has a flask shaped main body with a flat top and a neck of substantially uniform diameter on the top. The neck of the disposable canister is configured to vertically engage the central chamber of the cartridge head. A pair of tab receptacles are provided on the cartridge head and a complementary pair of tabs on the canister are engageable with one another by ¼ rotation of the canister to lock the canister to the cartridge head. Thus, once the disposable canister is spent, both a rotational and vertical disengagement mechanism are required to unlock and separate the canister from the cartridge head, which is not desirable for water filtration systems located in constrained spaces. In addition, the entire canister is disposable causing increased environmental waste.

Another system provides a filtering system for water treatment including a head member having inlet and outlet ports and a replaceable, disposable filter cartridge for insertion into the head member. The filter cartridge includes a dual lug retaining system for retaining the filter cartridge in the head member. The lugs are formed with a tapered end to assist in rotating the cartridge approximately 90 degrees to a secured position in the head member. The filter system provides insertion of the filter cartridge into the head member via a rotational and vertical disengagement mechanism. Additionally, the filter cartridge unit is designed as a unitary disposable unit.

In yet another system, a disposable separation module is disclosed that is capable of connecting to a fluid processing system in a quick-connect fashion. The module includes a housing containing a separation element with a plurality of fluid connectors on one end of the housing that are parallel to and exclusive of each other. This arrangement provides for vertical engagement and sealing of the fluid connectors to corresponding mating connectors on the fluid processing system. To replace the disposable filtration module, a handle must be pulled in a direction that is perpendicular to the direction of motion required for engaging the fluid connectors to the mating connectors to unlock the filtration module from the manifold. Thus, in order to insert and remove the filtration module to and from the manifold block and receptor, the user is required to perform a complex set of engagement and disengagement maneuvers.

There is a continuing need for water filtration systems that are capable of filtering water at the desired levels, take up less space, are quick and simple to maintain, and contribute less to environmental waste. There is also a need for a simplified engagement mechanism between the manifold and filter cartridge for use in a water filtration system that maintains a tight seal during use, but allows easy disengagement to change out the replaceable filter cartridge.

There is a further need to provide a modular water filtration system that can easily be adjusted through engagement mechanisms that allow numerous filter manifolds to be joined together to form multi-stage filtration systems. The modular systems are particularly useful in situations where the desired level of filtration is variable and/or may need to be adjusted depending on the water source and the needs of the end user.

SUMMARY

The disclosure relates generally to a water filtration system, and more specifically to a water filtration system that includes a modular setup that allows numerous filter manifolds to be easily attached together to form a multi-stage filtration system. The water filtration system includes an engagement mechanism between the filter manifold and the filter cartridge that allows the cartridge to be engaged in the manifold via a horizontal force. The water filtration system further allows filtration media to be easily and conveniently removed from the filter cartridge via a removable cap located at a terminal end of a sump that holds the filtration media.

The water filtration system reduces the time, effort, and expense necessary to install and maintain the water filtration system. The simplified engagement mechanism maintains a tight seal and utilizes a check valve to control fluid flowing through the system during operation, while at the same time allowing for easy disengagement when the filter cartridge is removed from the filter manifold. Additionally, providing a reusable filter cartridge that allows replacement of the filtration media from a lower end is more convenient and reduces environmental waste and expense associated with the system.

Some embodiments of the disclosure provide a water filtration system that includes a filter cartridge designed to be inserted into a filter manifold using horizontal force. The filter cartridge further includes a locking surface that engages tracks in the filter manifold to secure the filter cartridge in a releasable manner.

Some other embodiments of the disclosure provide a water filtration system that includes a filter manifold having a rotatable cover. A filter cartridge is provided that includes a sump having a filter head integrally secured to a first end, and a cap releasably secured to a second end. An engagement mechanism extending from the cover locks into the filter manifold to position the cartridge in an "in-use" state. The filter cartridge further includes two offset cylindrical inlet and outlet members protruding from the filter head that are designed to engage corresponding inlet and outlets of the filter manifold. A check valve is positioned within the filter manifold adjacent the inlet of the filter cartridge to control fluid flow through the water filtration system.

In one aspect, a modular water filtration system including a filter manifold and a filter cartridge is provided. The filter manifold includes a body, a first arm member, a second arm member, a brace, and a slot positioned on the brace. The filter cartridge includes a cartridge head and a fin member protruding upwardly from the cartridge head, and the fin member is sized to be received within the slot of the filter manifold. The filter cartridge is adapted to engage the filter manifold through a horizontal force when the fin member is aligned with the slot.

In some embodiments, the filter cartridge further includes an inlet tube and an outlet tube protruding horizontally from the cartridge head, and the fin member extends at least partially above the inlet tube and the outlet tube. The fin member is positioned and located between the inlet tube and the outlet tube, or adjacent to the outlet tube and a first outer edge of the cartridge head, or adjacent to the inlet tube and a second outer edge of the cartridge head.

In other embodiments, the slot is positioned and located between the first arm member and the second arm member.

In some embodiments, the first arm member and the second arm member define a receiving section of the filter manifold. The receiving section is adapted to receive the cartridge head of the filtration cartridge.

In yet other embodiments, the fin member is provided as a substantially rectangularly-shaped prism and the slot is provided as a substantially rectangularly-shaped recess.

In some embodiments, the brace of the filter manifold further includes channels disposed thereon, and the slot is provided within the channels.

In another aspect, a modular water filtration system comprising a first filter manifold and a filter cartridge is provided. The first filter manifold includes a housing, a first slot member extending in a substantially horizontal direction that is positioned and located within the housing, and a cover rotatably coupled to the housing. The cover includes locking ribs that protrude horizontally and inwardly from a body of the cover. The filter cartridge includes a cartridge head and a first fin protruding upwardly from the cartridge head. The shape of the first fin corresponds to the shape of the first slot member such that the first fin can be received in the first slot member. The filter cartridge is adapted to engage the first filter manifold via a horizontal force when the first fin is aligned with the first slot member. The cover engages the cartridge head as the cartridge head moves towards the housing of the first filter manifold and the locking ribs lock the filter cartridge to the first filter manifold.

In some embodiments, the filter cartridge further includes catch members that protrude upwardly from a surface of the cartridge head, and the catch members engage the locking ribs when the filter cartridge is received in the first filter manifold.

In other embodiments, the cartridge head of the filter cartridge further includes a second fin and the housing of the first filter manifold further includes a second slot member. In such embodiments, the filter cartridge is adapted to engage the first filter manifold via the horizontal force when the second fin is aligned with the second slot member.

In yet other embodiments, the housing of the first filter manifold further includes two members extending outwardly and horizontally away from the housing. The two members define a receiving area. A plurality of channels is positioned and located between the two members and within the receiving area. In some such embodiments, the cartridge head of the filter cartridge further includes a second fin and the housing of the first filter manifold further includes a second slot member. The first slot member is disposed within a first channel of the plurality of channels and the second slot member is disposed within a second channel of the plurality of channels. Further, at least one additional channel of the plurality of channels is positioned and located between the first channel and the second channel.

In some embodiments, the housing of the first filter manifold further includes a plurality of channels extending horizontally within the housing, and the first slot member is disposed in a first channel of the plurality of channels.

In other embodiments, a second filter manifold is provided, and the first filter manifold is in fluid communication with the second filter manifold.

In yet another aspect, a modular water filtration system including a filtration manifold and a filtration cartridge is provided. The filtration manifold includes a housing having a body extending in a first direction, and a first elongated member and a second elongated member extending outwardly from the body in a second direction. The first elongated member and the second elongated member define a receiving area of the housing therebetween. The filtration manifold further includes an inlet and an outlet positioned and located within the receiving area, the inlet and the outlet extending from the housing substantially in the second direction. A plurality of channels is positioned and located proximate to the inlet and the outlet, and each channel of the plurality of channels extends substantially in the second direction away from the body of the housing and into the receiving area. A first channel of the plurality of channels includes a first slot extending into the channel substantially in the second direction and towards the housing. The filtration cartridge is designed to be received by the receiving area of the filter manifold when inserted into the filter manifold in substantially the second direction.

In some embodiments, the plurality of channels of the filter manifold further includes a second slot, and each channel of the plurality of channels are substantially parallel to each other. In some such embodiments, the first slot and the second slot are separated by at least one channel.

In other embodiments, the plurality of channels of the filter manifold includes a second slot and a third slot. The first, second, and third slots may be proximate to each other, or any of the first, second, and third slots may be separated by at least one channel.

In yet other embodiments, the filter cartridge further comprises at least one fin extending away from the filter cartridge in the second direction. A first fin of the at least one fin is received into the first slot when the filter cartridge is inserted into the receiving area.

In some embodiments, a brace extends from the first elongated member and towards the second elongated member in a third direction, and the plurality of channels is provided on the brace.

In other embodiments, the inlet and the outlet of the filter manifold are offset relative to each other in the first direction, and the filter cartridge is designed to couple to the inlet and the outlet.

These and other aspects of the disclosure will become apparent in light of the following detailed description.

DESCRIPTION OF THE DRAWINGS

FIG. 31 is an exploded isometric view of the filter cartridge of FIG. 1 disengaged from the filter manifold of FIG. 1;

FIG. 32 an isometric view of the filter cartridge of FIG. 1 engaged to the filter manifold of FIG. 1;

FIG. 33 is a partial isometric view of the water filtration system of FIG. 1 in an operational position;

FIG. 34 is a partial isometric view of the water filtration system of FIG. 1 with the cover rotatably disengaged from the filter cartridge;

FIG. 35 is an isometric view of the water filtration system of FIG. 1 in an operational position;

FIG. 41 is partial cross-sectional schematic view of the water filtration system of FIG. 1 showing the filter cartridge engaged with the filter manifold and further including the valve of FIG. 11 disposed within the filter manifold;

DETAILED DESCRIPTION

Figure 1:
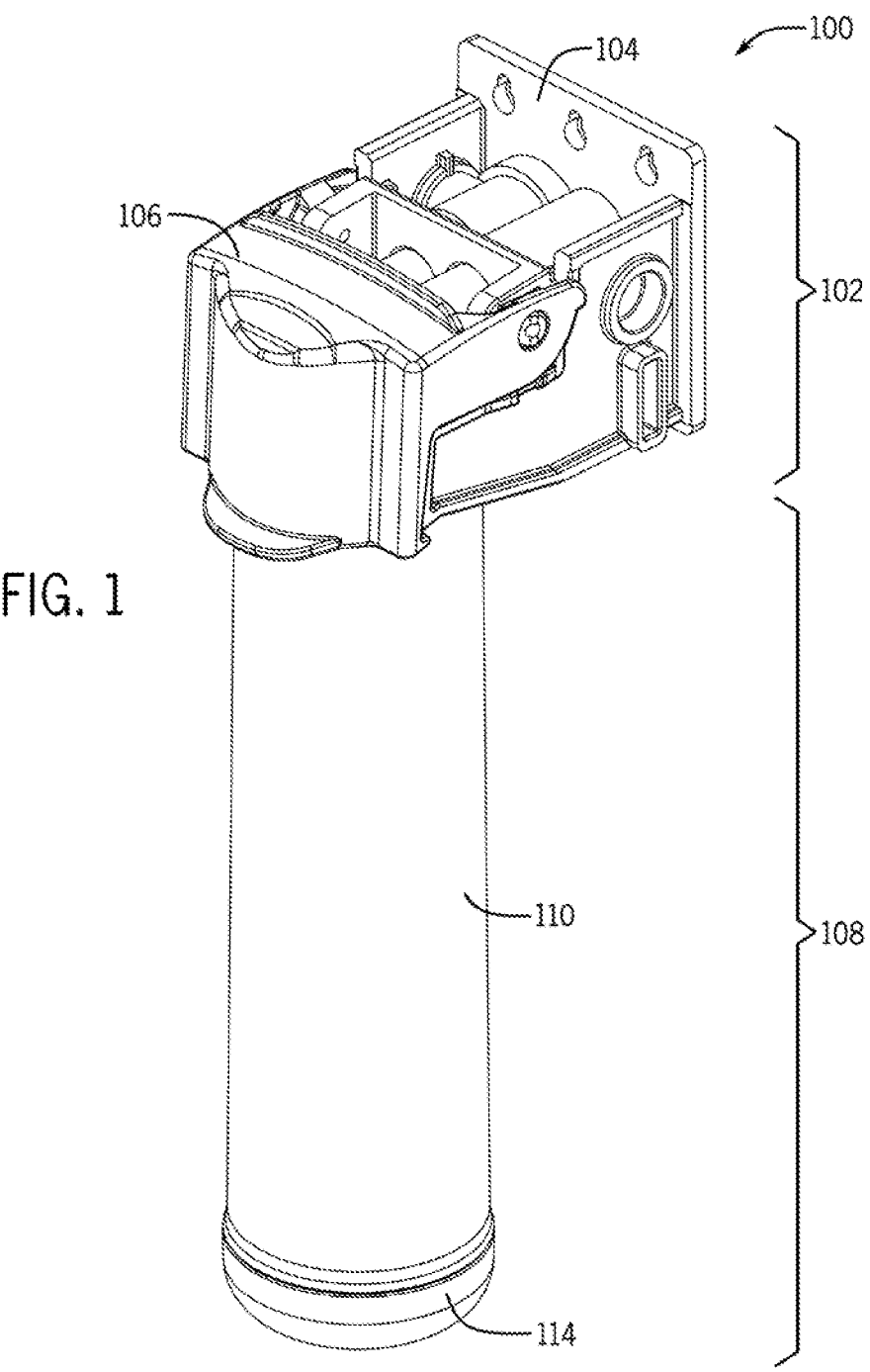
FIG. 1 is an isometric view of a water filtration system that includes a filter manifold having a housing and a cover, and a filter cartridge including a filter head, a sump, and a removable cap, according to one embodiment of the disclosure.
Figure 2:
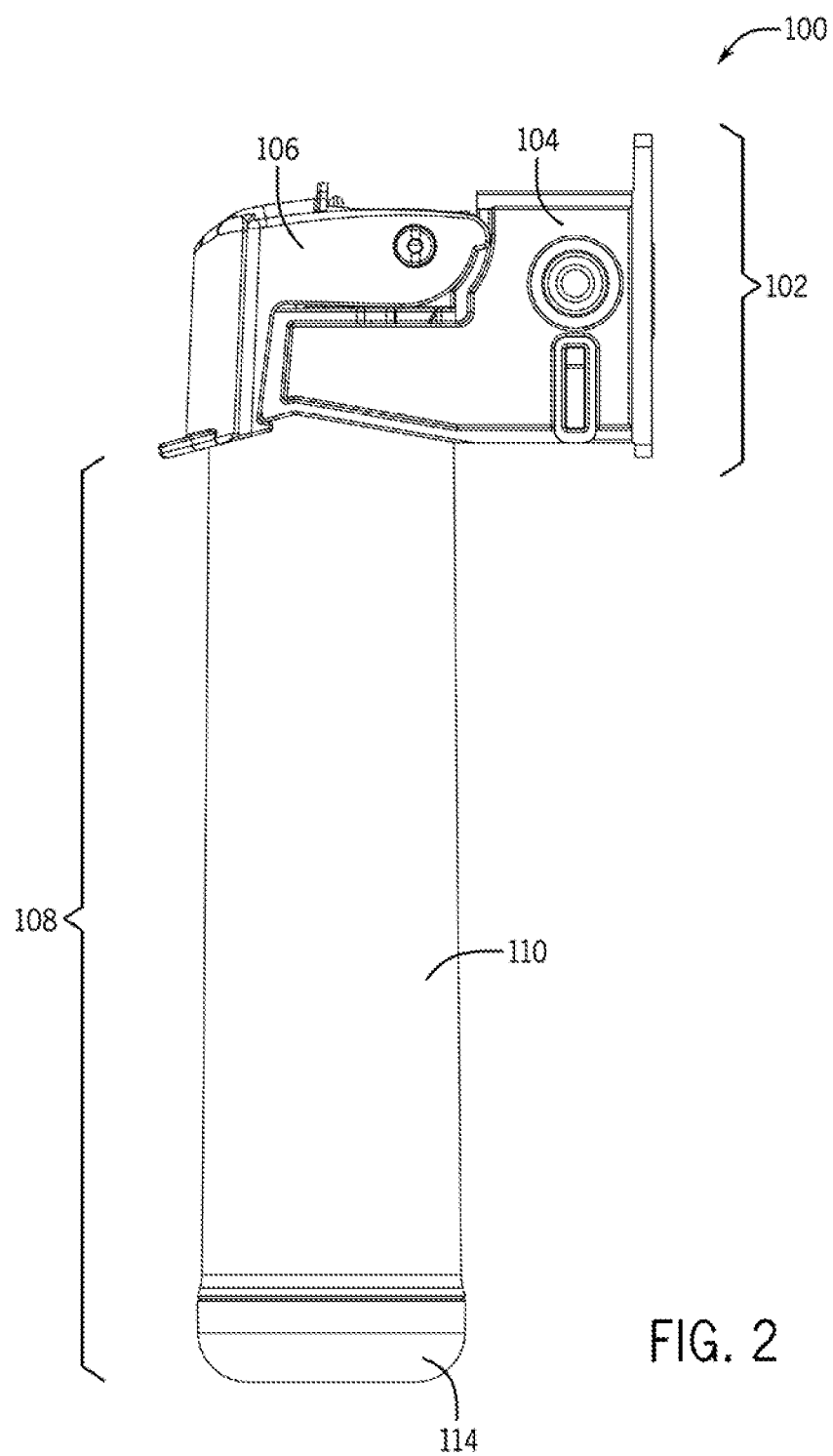
FIG. 2 is a left side elevational view of the water filtration system of FIG. 1.
Figure 3:
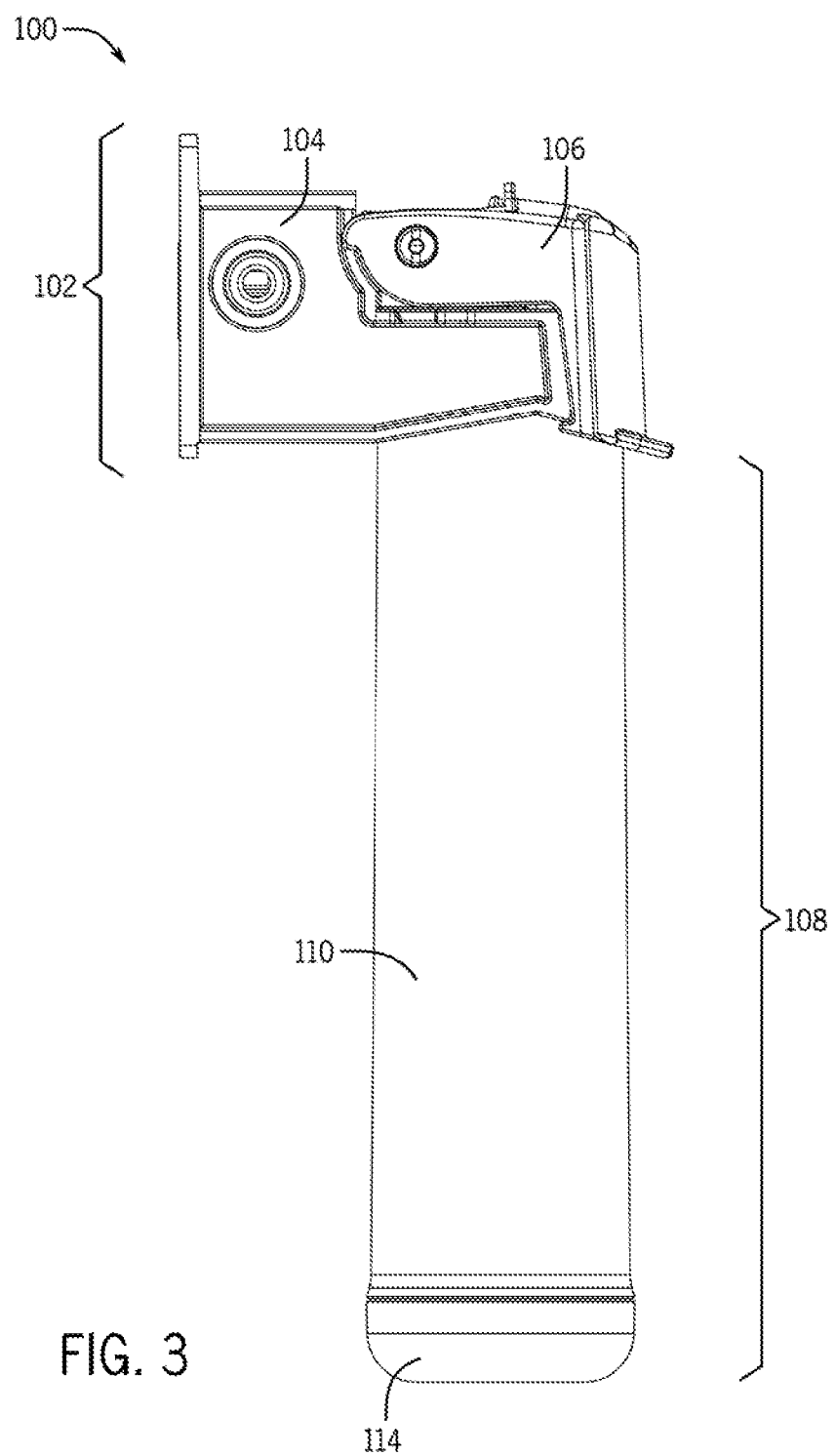
FIG. 3 is right side elevational view of the water filtration system of FIG. 1.
Figure 4:
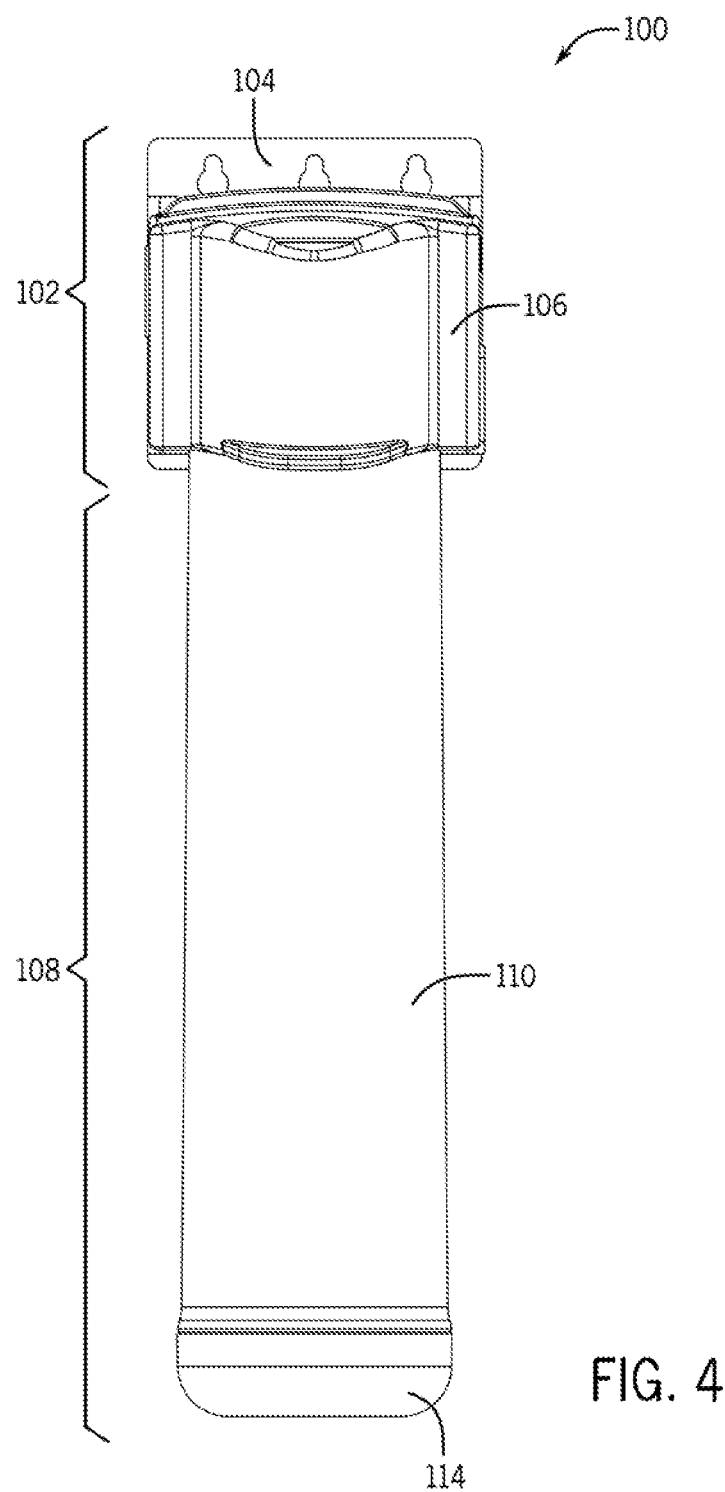
FIG. 4 is a front elevational view of the water filtration system of FIG. 1.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of embodiments of the disclosure.

FIGS. 1-4 illustrate a water filtration system 100 according to one embodiment of the disclosure. The water filtration system 100 is fluidly coupled to a water feed line (not shown) and/or a water supply line (not shown) and is designed to filter contaminates from the water supply. The water filtration system 100 includes a filter manifold 102 defined by a housing 104 in communication with a rotatable cover 106. The filter manifold 102 is releasably coupled to a filter cartridge 108. The filter cartridge 108 includes a sump 110 that includes a cartridge head 112 at one end and a removable cap 114 at an opposing end (see e.g., FIGS. 28-30). The filter cartridge 108 holds replaceable filtration media 116 (see FIGS. 28-30) in an interior cavity. Contaminants and other impurities are removed as water flows through the filtration media 116 of the filter cartridge 108.

As shown in FIGS. 5-10, the housing 104 of the filter manifold 102 includes a bracket 120 having a rear surface 122 and a front surface 124 with two opposing arm members 126a, 126b protruding outwardly from the front surface 124. The arm members 126 are joined by a brace 128 that extends between interior surfaces 130a, 130b of the arm members 126a, 126b. The bracket 120, arm members 126a, 126b, and brace 128 collectively define an interior section 132, which holds one or more internal components discussed below.

Still referring to FIGS. 5-10, the bracket 120 is formed by a substantially square body 134 that includes a plurality of holes 140 that extend through the body 134 from the rear surface 122 to the front surface 124. The holes 140 are adapted to support one or more attachment components in the form of screws (not shown). The screws may be inserted through the holes 140 to secure the filter manifold 102 to a surface (not shown). In the embodiment depicted, three holes 140 are disposed adjacent a top edge of the body 134 and one hole 140 is disposed adjacent a bottom edge of the body 134. An opening 142 (see FIG. 6) is optionally provided through the rear surface 122 disposed adjacent the holes 140 that is in communication with one or more internal components of the filter manifold 102.

The filter manifold 102 may be used in numerous settings and secured to a variety of surfaces. For example, the filter manifold 102 may be secured to a vertical wall under a sink adjacent the water feed line. In another instance, the filter manifold 102 may be secured to an interior portion of a refrigerator. In other instances, the filter manifold 102 is in fluid communication with the water feed line and may not be secured to any surfaces.

Figure 5:
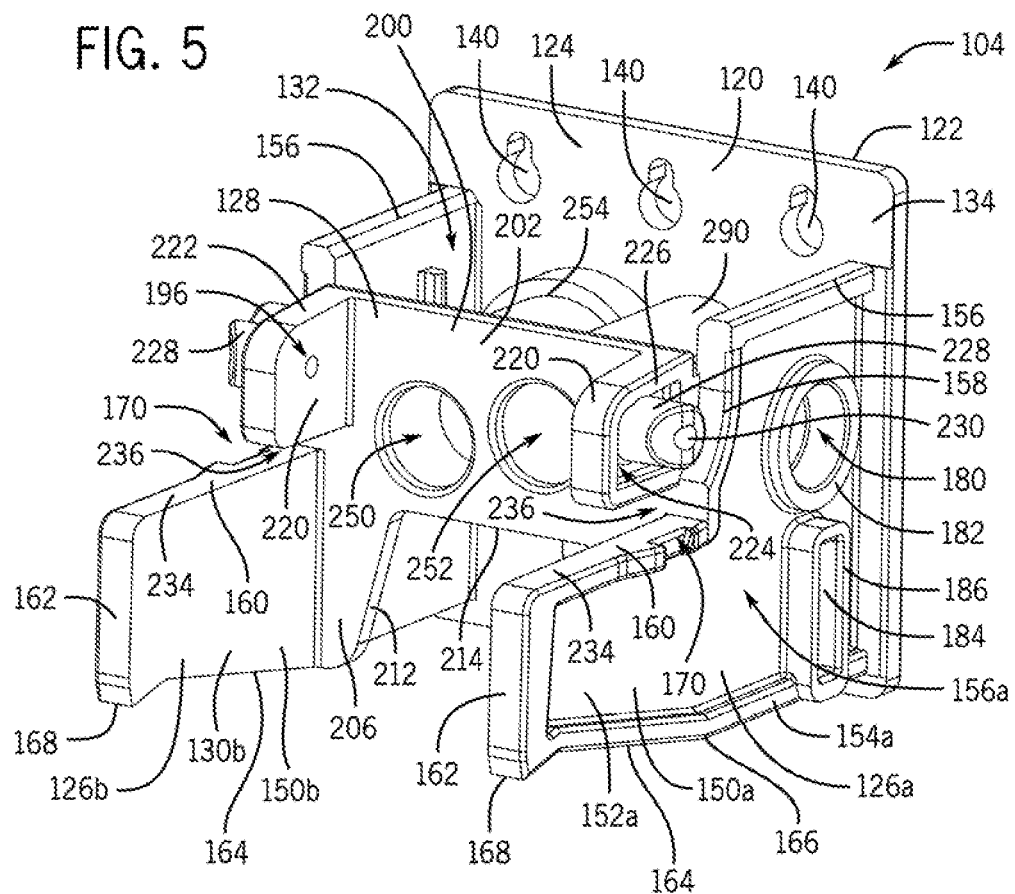
FIG. 5 is an isometric view of the housing of FIG. 1.
Figure 7:
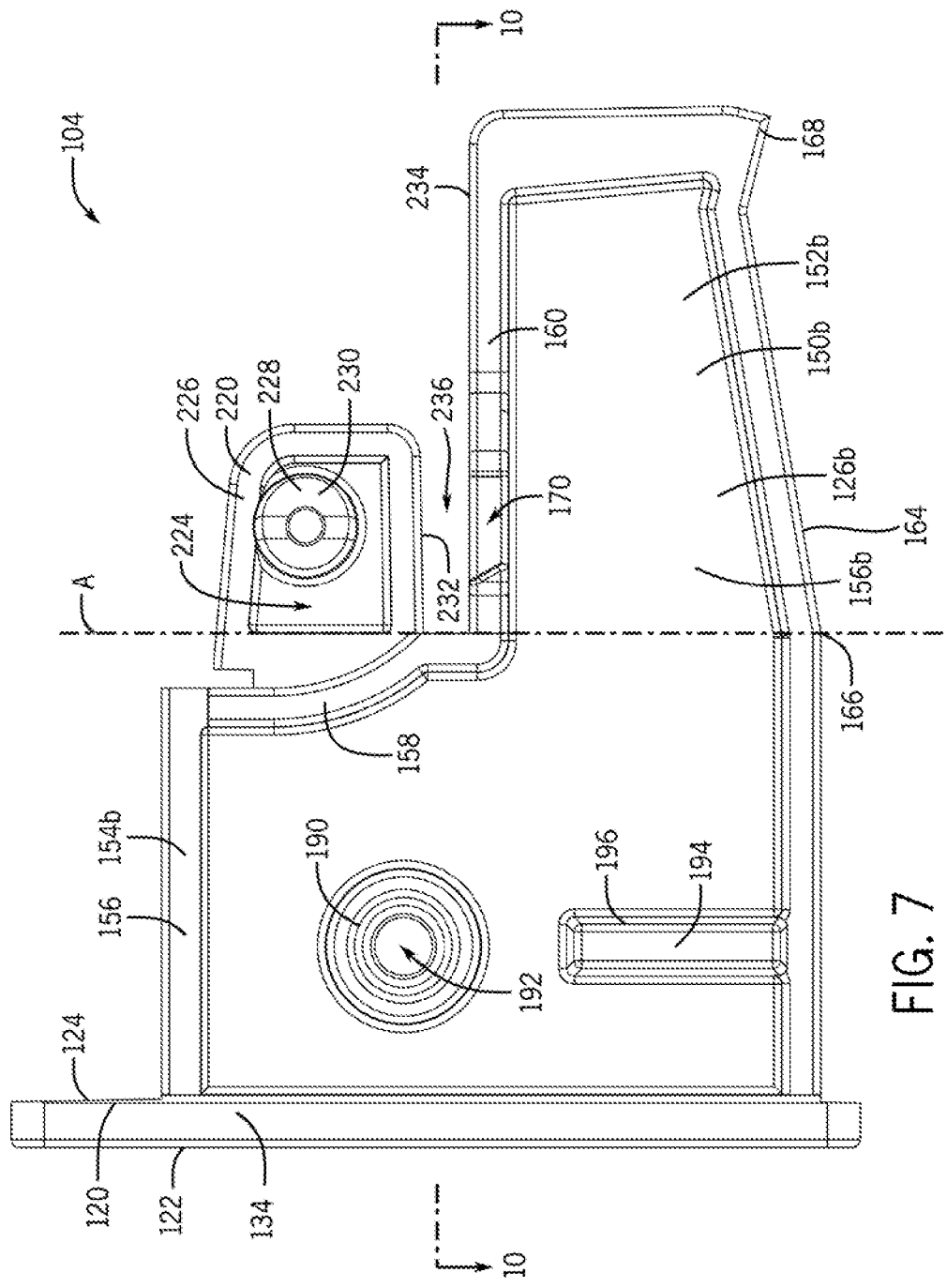
FIG. 7 is a side elevational view of the housing of FIG. 1.

As shown in FIGS. 5 and 7, the arm members 126a, 126b protrude outwardly from opposing lateral edges of the front surface 124 of the bracket 120. In the embodiment depicted, the arm members 126a, 126b are spaced slightly interiorly of the lateral edges of the bracket 120. The arm members 126a, 126b each include a substantially L-shaped body 150a, 150b that each has interior surfaces 130a, 130b and opposing exterior surfaces 152, 152a. The interior surface 130a, 130b is substantially smooth and the exterior surface 152a, 152b is defined by a raised flange 154a, 154b that circumscribes the perimeter of the body 150a, 150b to form a recess 156a, 156b therein.

Still referring to FIGS. 5 and 7, the structure of the raised flange 154a, 154b of each arm member 126a, 126b is the same, so only one flange 154 will be discussed for clarity, with the same structure labeled on both arm members 126a, 126b. In particular, the raised flange 154 includes an upper section 156 that protrudes outwardly in a substantially horizontal orientation and terminates at a curved section 158. The curved section 158 is slightly concave and terminates at a lower section 160 of the flange 154. The lower section 160 of the flange 154 extends outwardly from the curved section 158 in a horizontal orientation that is similar to the orientation of the upper section 156. The lower section 160 of the flange 154 terminates at a substantially vertical endwall 162. The endwall 162 is in communication with a bottom section 164 that extends rearwardly at an incline until becoming substantially horizontal at a point 166 (see FIG. 7) that is along an axis A defined by the point in which the curved section 158 intersects the lower section 160. The intersection of the endwall 162 and the bottom section 164 define detents 168 designed to interact with the cover 106 of the filter manifold 102 when the cover 106 is in a locked position.

Figure 10:
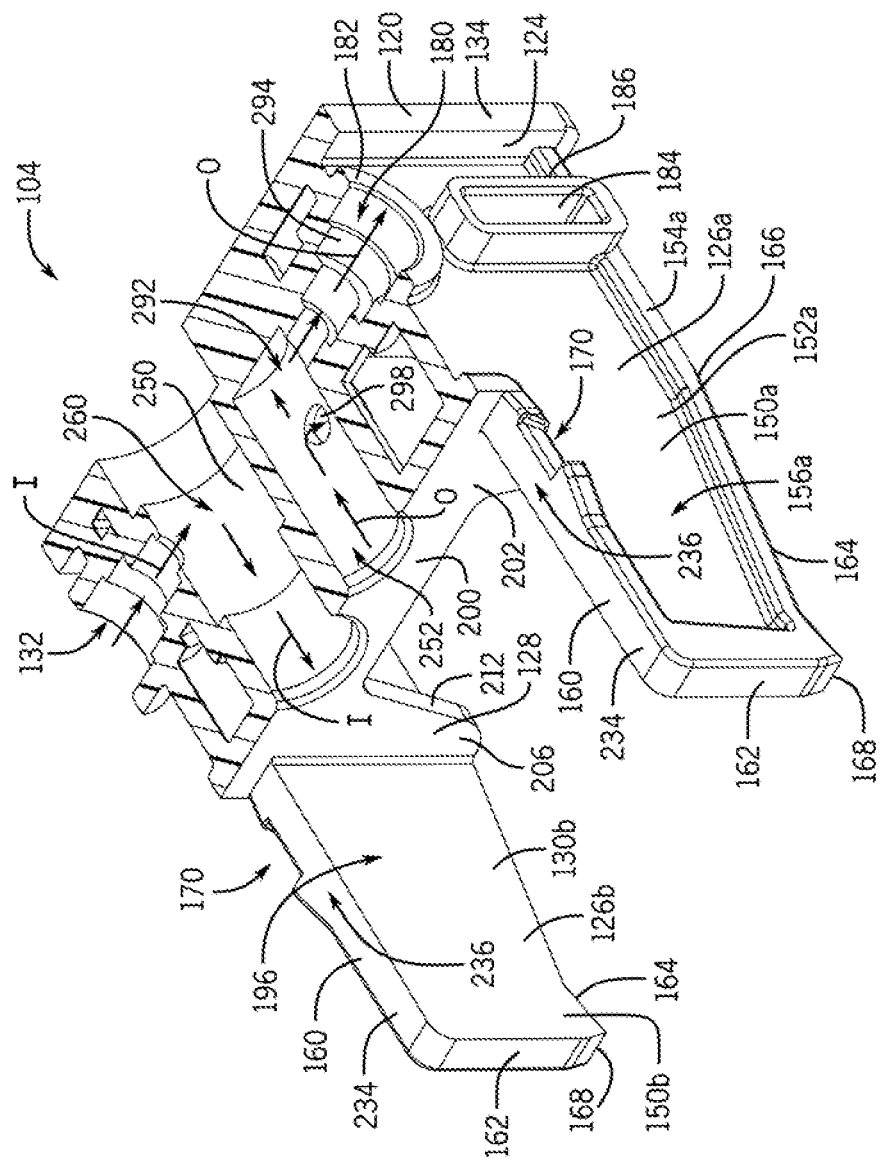
FIG. 10 is a partial sectional, isometric view of the housing of FIG. 1 taken substantially along line 10-10 of FIG. 7.
Figure 11:
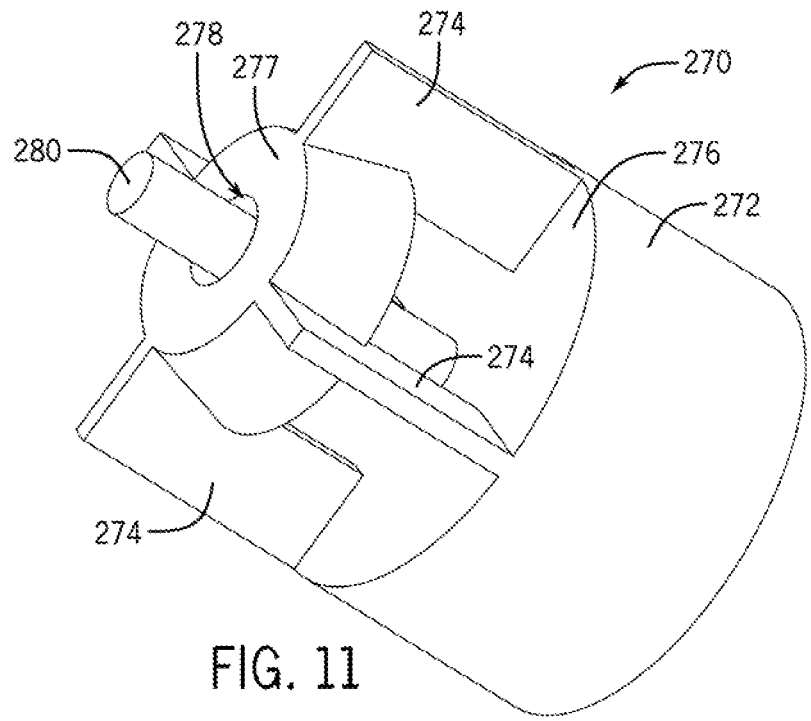
FIG. 11 is an isometric view of a valve suitable for use with the water filtration system of FIG. 1.
Figure 12:
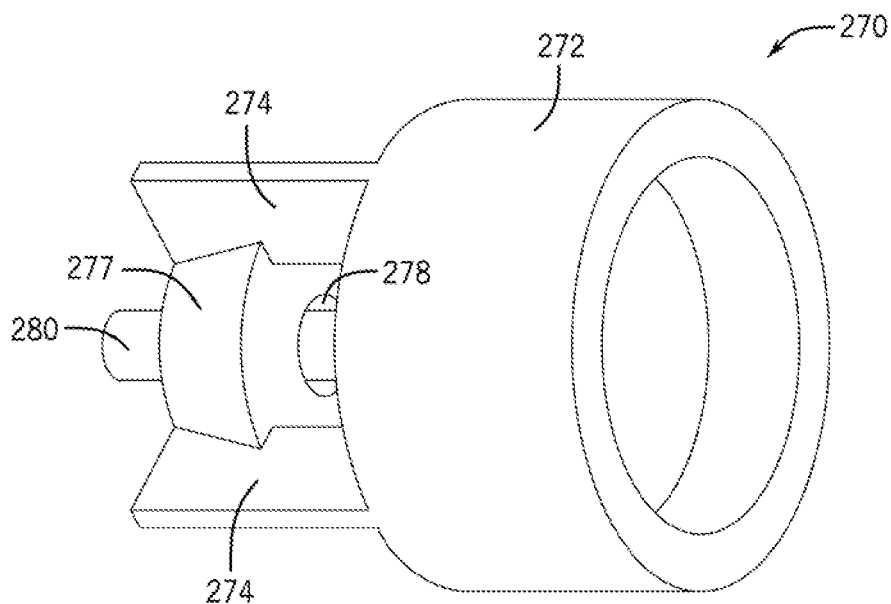
FIG. 12 is a different isometric view of the valve of FIG. 11.

As shown in FIG. 10, the lower section 160 of the flange 154 is interrupted by an angled notch 170 that includes two opposing angled walls. The notch 170 is positioned vertically above the point 166 and adjacent the intersection of the curved section 158 and the lower section 160. The notch 170 provides clearance for the cover 106 to rotate into an open position. The angled side wall to the left of the notch 170 prevents the cover 106 from over-rotation, whereas the angled side wall to the right of the notch 170 holds the cover 106 open during the filter cartridge 108 replacement procedure, but allows the cover 106 to be rotated into a closed position.

Referring again to FIG. 5, the arm member 126a further includes a circular duct 180 that extends through the body 150a and is surrounded by a substantially annular rib 182 that protrudes outwardly from the exterior surface 152a of the body 150a. The circular duct 180 is designed to provide fluid communication between the filter manifold 102 and either other filter manifolds 102 (when more than one filtration stage is utilized), and/or with the water supply line. The arm member 126a also includes a racetrack shaped opening 184 disposed below the circular duct 180. The racetrack shaped opening 184 extends through the body 150a and is surrounded by a similarly shaped rib 186 that protrudes outwardly from the exterior surface 152a of the body 150a. The racetrack shaped opening 184 optionally acts as an alignment and engagement mechanism in conjunction with corresponding similarly shaped protrusions (discussed below) when more than one filter manifolds 102 are in communication with each other.

Figure 6:
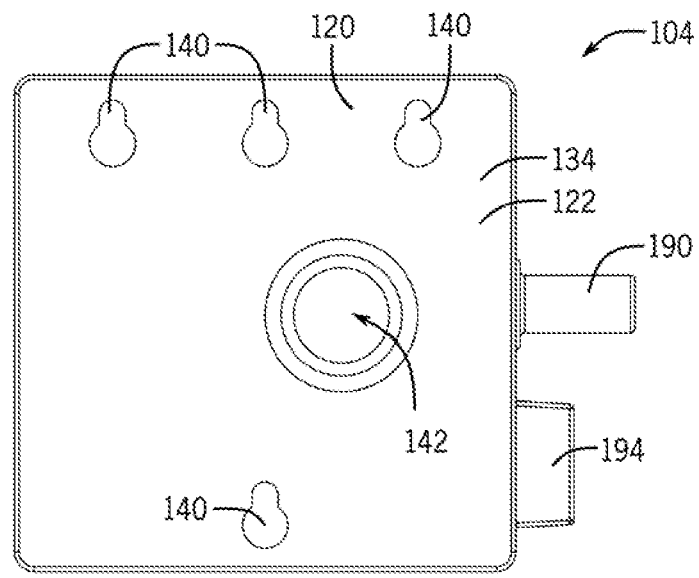
FIG. 6 is a rear elevational view of the housing of FIG. 1.
Figure 8:
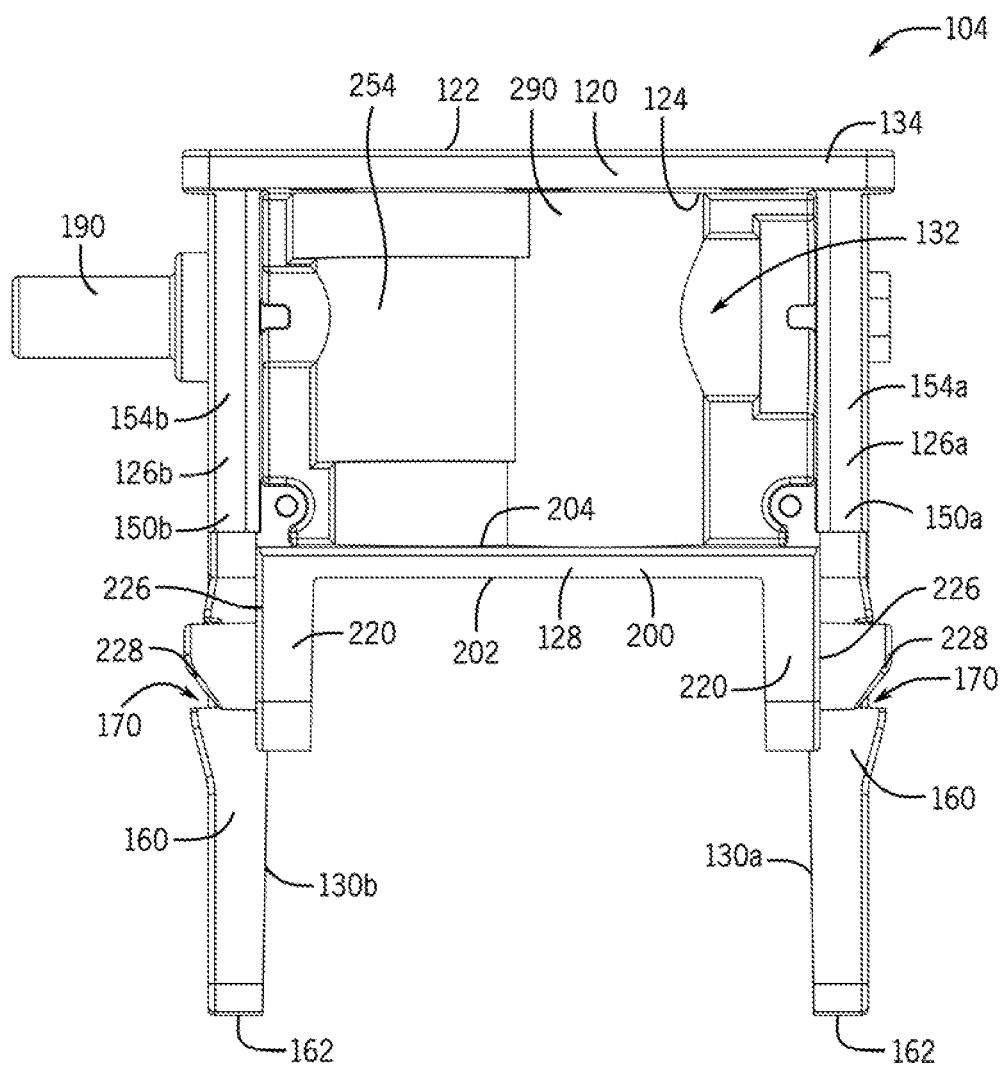
FIG. 8 is a top plan view of the housing of FIG. 1.

As shown in FIGS. 6-8, arm member 126b includes a cylindrical protrusion 190 that extends outwardly from the exterior surface 152b of the body 150b. The cylindrical protrusion 190 defines a cylindrical bore 192 that provides fluid communication between the water feed line and the filter manifold 102 and/or between an adjacent filter manifold 102. The arm member 126b further includes a racetrack shaped rib member 194 (see FIG. 6) disposed below the cylindrical bore 192. The racetrack shaped rib member 194 extends outwardly from the body 150b and is surrounded by a similarly shaped flange 196 that is adjacent the exterior surface 152b of the body 150b. The racetrack shaped rib member 194 optionally acts as an alignment and engagement mechanism when more than one filter manifolds 102 are in communication with each other. In particular, the rib member 194 is designed to fit into the racetrack shaped opening 184, and the cylindrical protrusion 190 is designed to extend into the duct 180 of an adjacent filter manifold 102 during multi-stage filtration. In some embodiments, one or more of the racetrack shaped openings/rib members 184, 194 are omitted and/or other engagement mechanisms and shapes are provided that assist in joining one or more filter manifolds 102.

Figure 9:
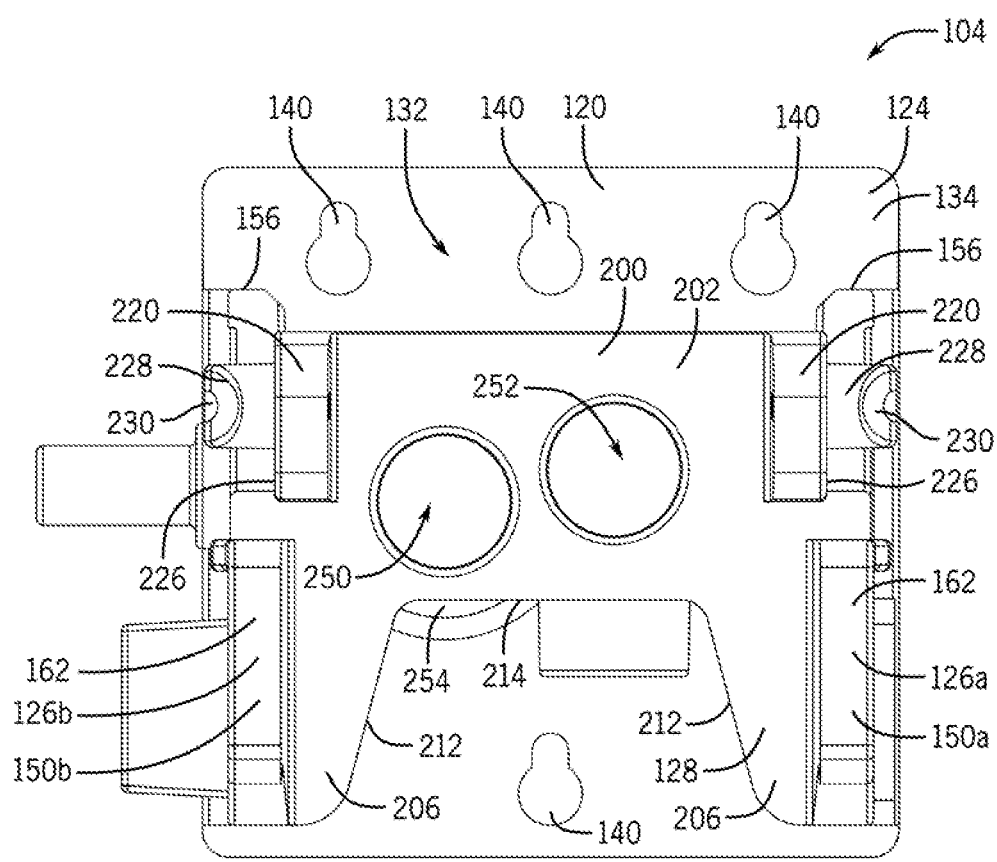
FIG. 9 is a front elevational view of the housing of FIG. 1.

As shown in FIGS. 5 and 9, the housing 104 of the filter manifold 102 further includes the brace 128 that mechanically joins the arm members 126a, 126b. In some embodiments, the brace 128 is integrally formed with the arm members 126a, 126b. Alternatively, the brace 128 may be joined to the arm members 126a, 126b by welding, or any suitable fastening technique. The brace 128 extends between interior surfaces 130a, 130b of the arm members 126a, 126b and divides the housing 104 into the interior (rear) section 132 and (front) receiving section 196.

The brace 128 is defined by a substantially rectilinear wall 200 that has a front surface 202 and an opposing rear surface 204 (as shown in FIG. 8). Two angled leg members 206 protrude downwardly on opposing sides of the wall 200. An interior edge 212 of the leg members 206 and lower edge 214 of the rectilinear wall 200 are designed to receive portions of the filter cartridge 108, as described below.

The wall 200 further includes two members 220 that extend outwardly from the front surface 202. Each member 220 includes a body 222 that has a recess 224 formed in a lateral surface 226. A circular projection 228 is disposed centrally in the recess 224 and protrudes outwardly before terminating at an angled end 230. The members 220 are inset slightly from the arm members 126a, 126b, as shown in FIG. 8. Lower surfaces 232 of the members 220 and upper surfaces 234 of the lower section 160 of the flange 154 form a track 236 (see FIG. 7) designed to support and receive portions of the filter cartridge 108, described in more detail below.

Turning again to FIGS. 5, 9, and 10, the wall 200 of the brace 128 includes a cylindrical inlet orifice 250 disposed adjacent to a cylindrical outlet orifice 252. The inlet and outlet orifices 250, 252 extend entirely through the wall 200 and are offset with respect to each other, whereby the inlet orifice 250 is disposed adjacent to the lower edge 214 of the rectilinear wall 200 and the outlet orifice 252 is disposed slightly above the inlet orifice 250. The inlet and outlet orifice 250, 252 are designed to facilitate fluid flow into and out of the filter manifold 102, respectively, from the filter cartridge 108.

As shown in FIGS. 5, 8, and 10, the inlet orifice 250 is disposed in an end of a cylindrical housing 254 that extends between the rear surface 204 of the wall 200 of the brace 128 and to the front surface 124 of the bracket 120. The inlet orifice 250 is in communication with an inlet chamber 260 that holds a valve 270 (as shown in FIGS. 11-14). The inlet chamber 260 defines a fluid path through the filter manifold 102 that is depicted by the arrows "I" shown in FIG. 10. The fluid path is formed between the water feed line, the cylindrical bore 192 of the arm member 126b (as shown in FIG. 7), and the inlet orifice 250.

Now turning to FIGS. 11-14, the valve 270 is disposed within the inlet chamber 260 and is designed to control water flow through the filter manifold 102. In one embodiment, the valve 270 includes a circular body 272 with four elongate ribs 274 extending downwardly from a lower surface 276 of the body 272. The ribs 274 are joined to a smaller frustoconical wall 277 that includes a circular opening 278. A cylindrical shaft 280 extends through the body 272 and through the opening 278. The shaft 280 assists in opening and closing the fluid passageways through the valve 270 when axial force is applied to the shaft 280.

Figure 13:
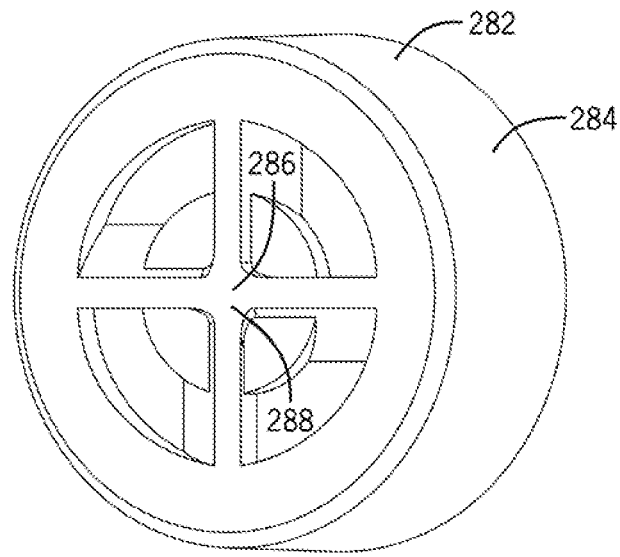
FIG. 13 is an isometric view of a cover member suitable for use with the valve of FIG. 11.
Figure 14:
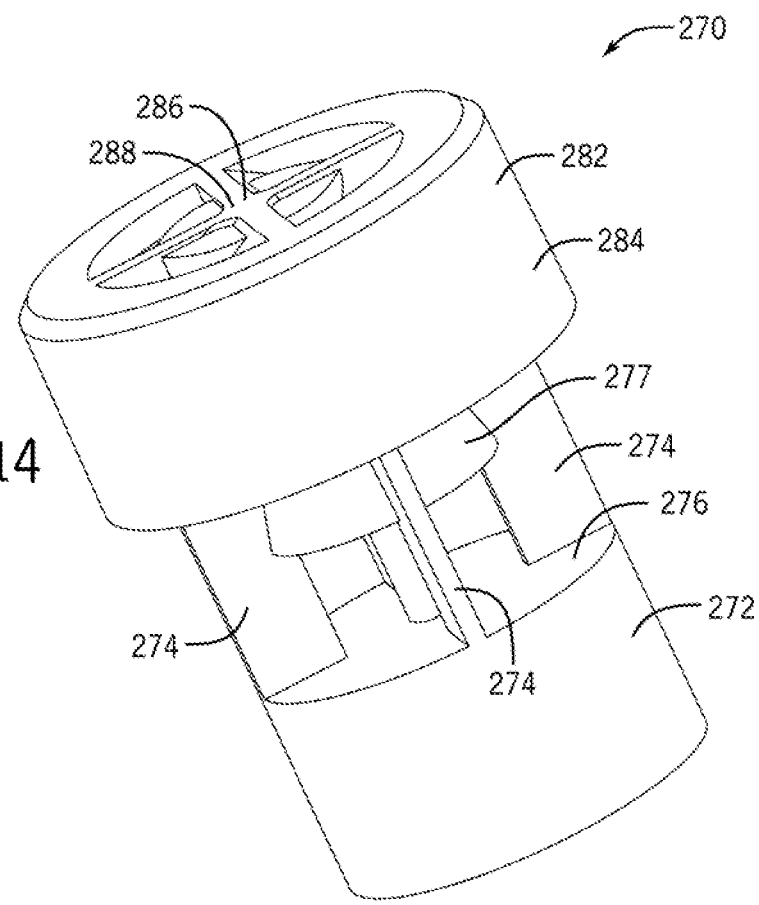
FIG. 14 is an isometric view of the valve of FIG. 11 in conjunction with the cover member of FIG. 13.

As shown in FIG. 13, the valve 270 further includes a circular sealing member 282 designed to act as a compression surface for the shaft 280 of the valve 270. The sealing member 282 includes a cylindrical body 284 with a cross-shaped member 286 defining a central intersection 288. As shown in FIG. 14, the shaft 280 of the valve 270 is designed to contact the intersection 288 of the cross-shaped members 286 during use. When the valve body 272 is forced toward the sealing member 282, the shaft 280 is axially displaced to open a fluid path. When the valve body 272 moves outwardly away from the sealing member 282, the shaft 280 returns to the rest position and closes the fluid pathway.

In one embodiment, the valve 270 is a check valve or other valve designed to allow fluid flow in only one direction. For example, one suitable valve 270 is any of the check valves designed by Neoperl, Inc. In other embodiments, the valve 270 may be other types of valves suitable for use in the water filtration system 100.

Turning again to FIGS. 8-10, the outlet orifice 252 is disposed in an end of a cylindrical housing 290 that extends between the rear surface 204 of the wall 200 of the brace 128 to the front surface 124 of the bracket 120. The outlet orifice 252 is in communication with an outlet chamber 292 that defines an outlet fluid path through the filter manifold 102 that is depicted by the arrows O shown in FIG. 10. The fluid path is formed between the outlet orifice 252, the outlet chamber 292, and the circular duct 180 of the arm member 126*a*.

Still referring to FIG. 10, the outlet chamber 292 includes an opening 294 that is in communication with the water supply line (not shown) that supplies water to the end user, and a secondary opening 298 that extends through a lower surface 296 of the housing 290. In one instance, the opening 294 is in fluid communication with additional filter manifolds 102 during multi-stage filtering. In another instance, the opening 294 is in communication with the water supply line. The secondary opening 298 is optional and may be in communication with additional filtration components that may or may not be utilized in conjunction with the water filtration system 100.

In some embodiments, the outlet orifice 252 is in communication with the outlet chamber 292 and holds a valve (not shown), such as a ball check valve. The valve may be disposed within the outlet chamber 292 adjacent the secondary opening 298 and is designed to inhibit leakage while changing the cartridge 108. In addition, the valve may inhibit the back flow of water into the cartridge 108 while water is supplied to the end user through the opening 294.

Figure 15:
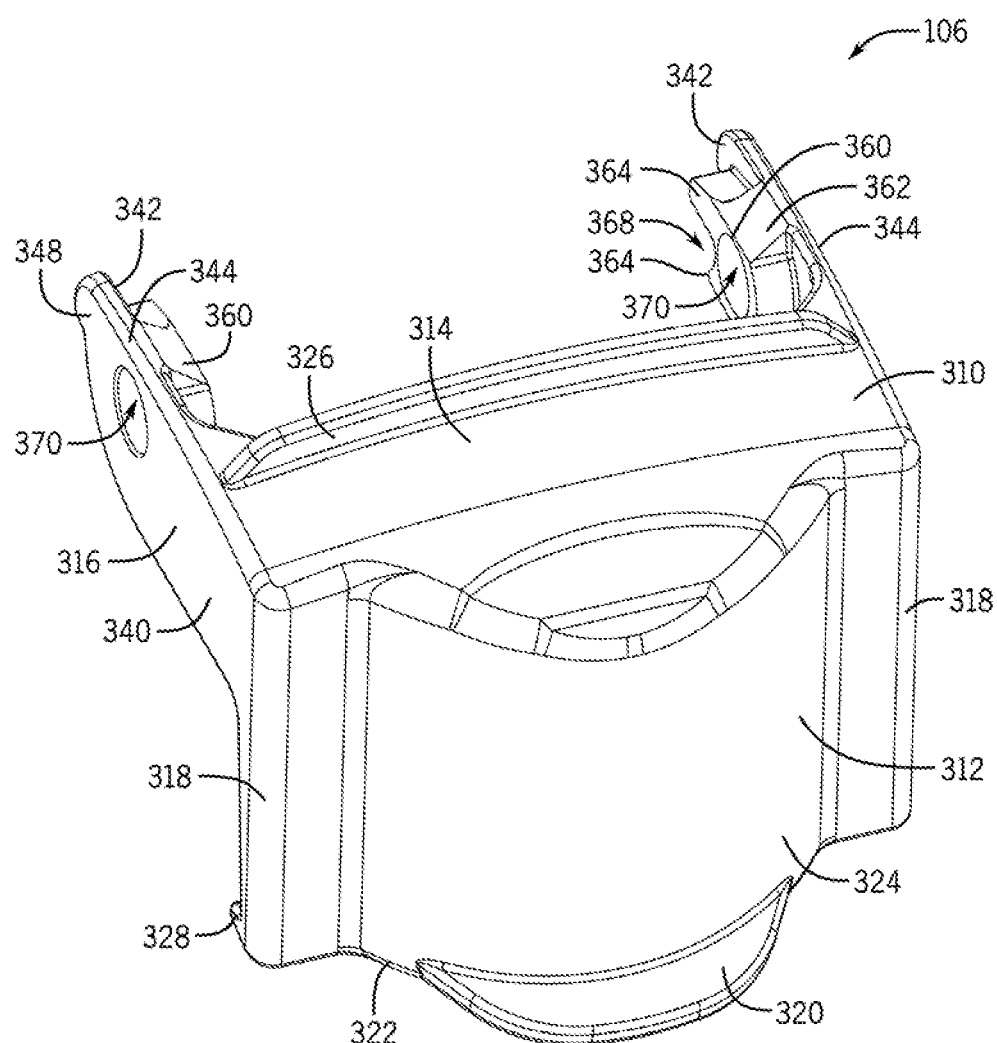
FIG. 15 is a front isometric view of the cover of FIG. 1.
Figure 16:
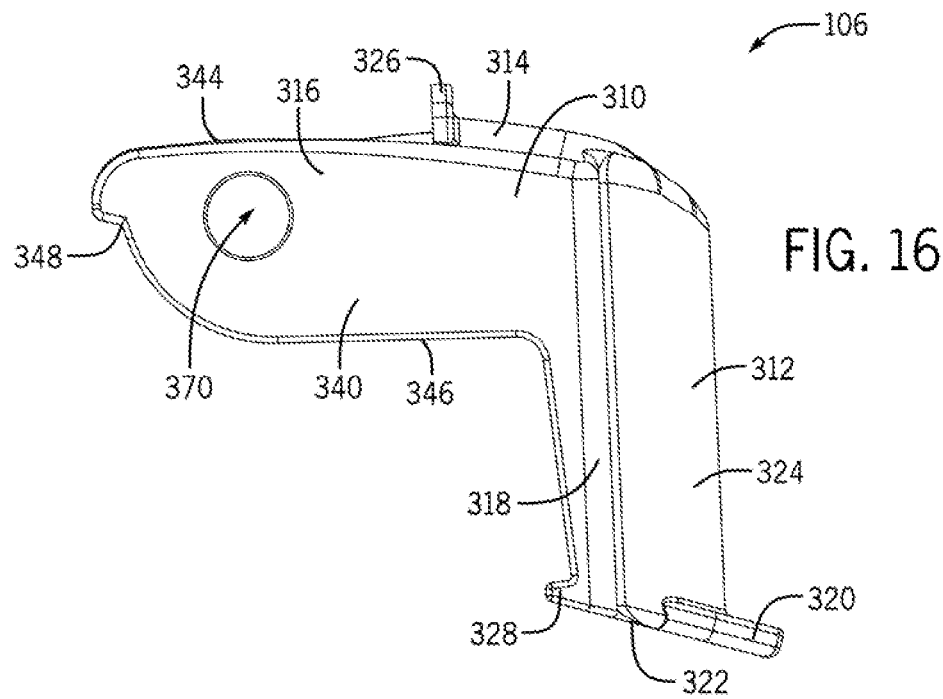
FIG. 16 is a side elevational view of the cover of FIG. 1.
Figure 17:
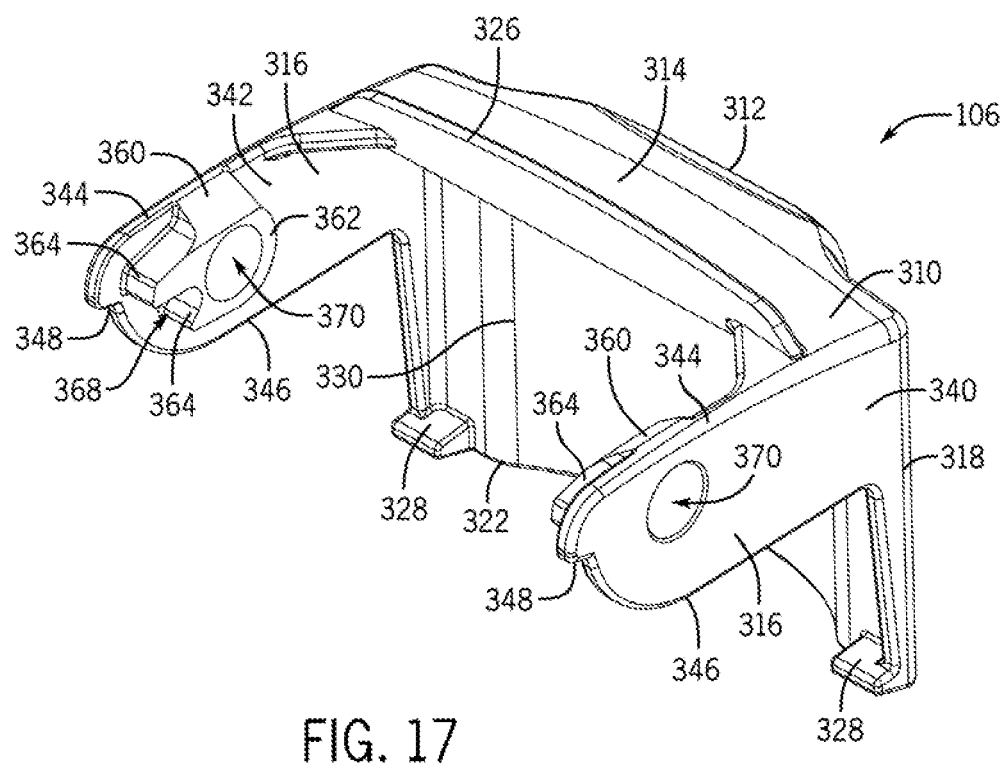
FIG. 17 is a rear isometric view of the cover of FIG. 1.
Figure 18:
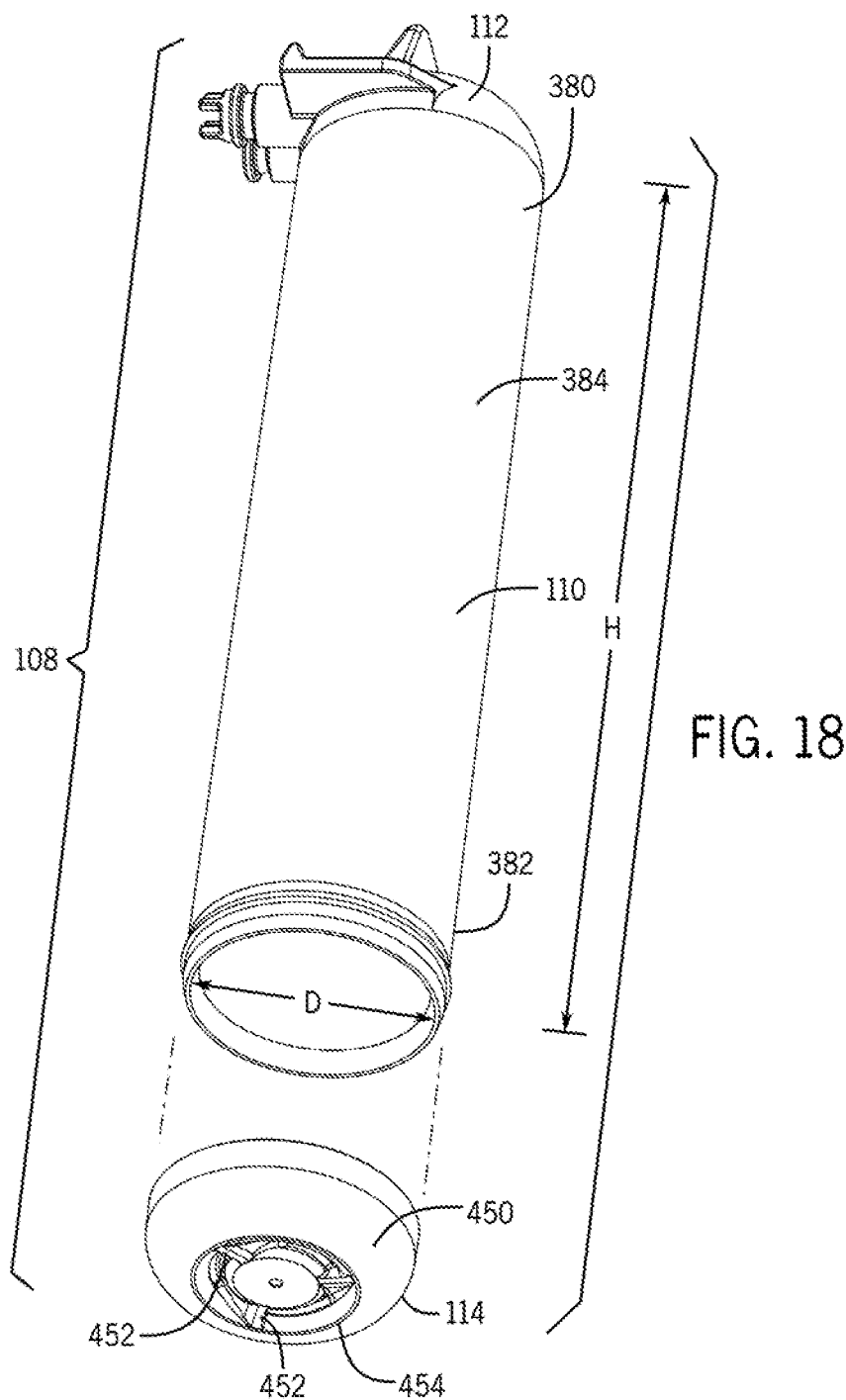
FIG. 18 is an isometric view of the filter cartridge of FIG. 1 with the cap removed.

Now turning to FIGS. 15-17, the cover 106 is rotatably attached to the filter manifold 102. The cover 106 includes a substantially L-shaped body 310 having a curved front wall 312 integral with a slightly protruding wall 314 extending from a rear surface of the front wall 312. Two members 316 extend outwardly from lateral edges 318 of the front wall 312 at opposing ends of the front wall 312.

Still referring to FIGS. 15-17, the curved front wall 312 further includes a curved lip member 320 that juts outwardly along a lower edge 322 of a front surface 324 of the wall 312. The lip member 320 acts as a finger grip that a user may utilize to apply force to rotate the cover 106. An elongate ridge 326 extends across the surface of the protruding wall 314 and tapers adjacent the opposing ends.

As shown in FIG. 17, two locking ribs 328 protrude horizontally inwardly from a rear surface 330 of the wall 312 adjacent the lower edge 322 on opposing ends of the wall 312. The locking ribs 328 are designed to interact with portions of the filter cartridge 108 to lock the cartridge 108 to the filter manifold 102, as described in detail below.

Still referring to FIGS. 15-17, the protruding members 316 each include a substantially smooth exterior surface 340 and an opposing interior surface 342. The protruding members 316 also include curved upper and lower surfaces 344, 346, respectively. The protruding members 316 extend outwardly from the wall 312 until terminating at a hook member 348 disposed at the ends.

Locking members 360 extend inwardly from each of the interior surfaces 342 of the protruding members 316 and include a substantially annular body 362 having two claw members 364 (see FIG. 17) that extend outwardly toward the hook members 348. The claw members 364 define a recess 368 designed to interact with portions of the filter cartridge 108. The locking members 360 each include an aperture 370 that extends entirely through the locking member 360 from the exterior surface 340 to the opposing interior surface 342. The apertures 370 are designed to receive the circular projections 228 on the brace 128 of the housing 104 to rotatably lock the cover to the housing 104.

Now turning to FIGS. 18-30, the filter cartridge 108 includes the sump 110 having the cartridge head 112 at one end 380 and the removable cap 114 at an opposing end 382. The sump 110 is an elongate cylindrical housing 384 that is designed to hold and protect one or more components of the filtration media 116 and the internal components of the filter cartridge 108. In some embodiments, the sump 110 includes a height dimension H of about 28 cm to about 30 cm and a diameter dimension D of about 5 cm to about 8 cm. It should be appreciated that the size of the sump 110 may be adjusted depending on the desired filtration needs.

Figures 19, 20:
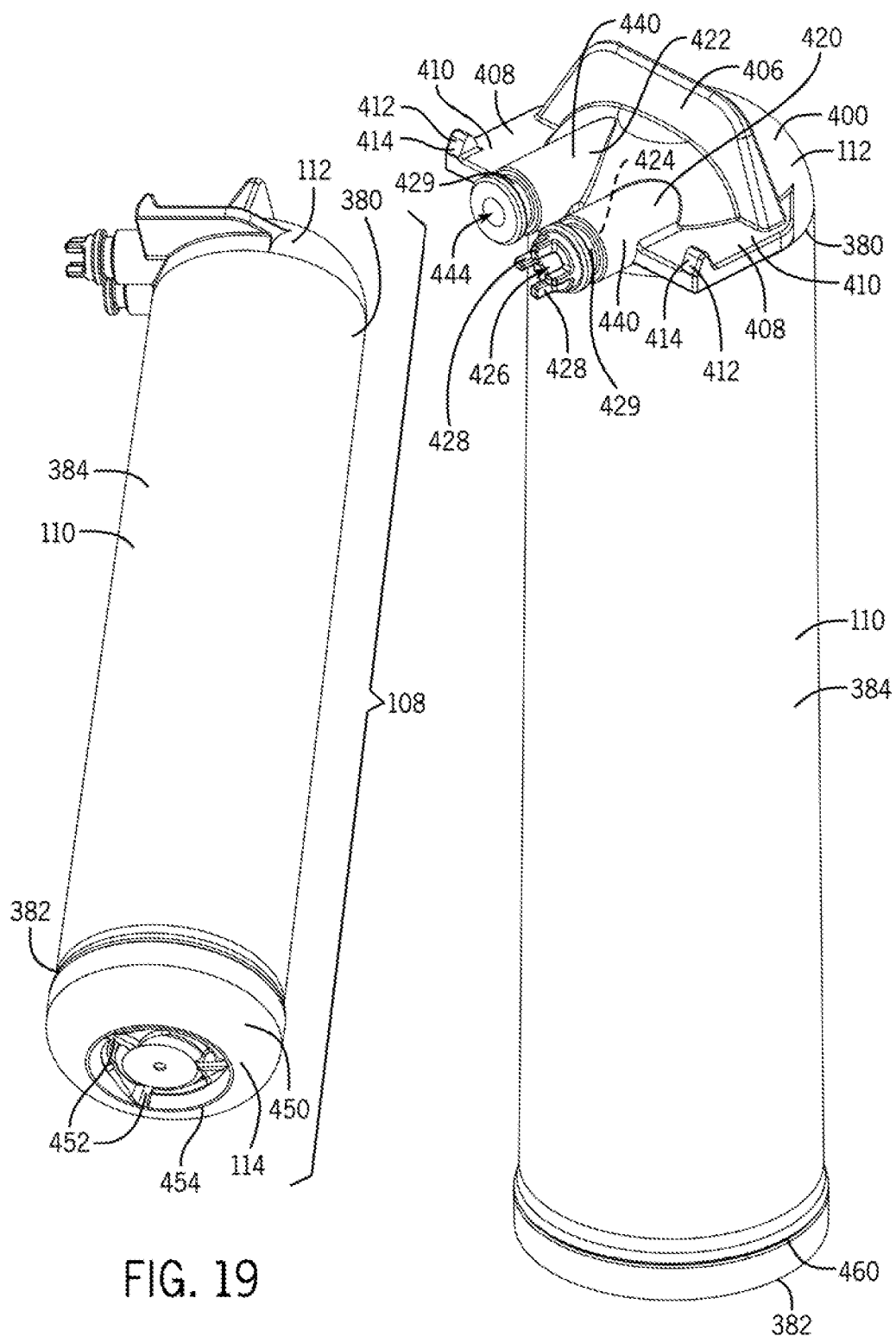
FIG. 19 is an isometric view of the filter cartridge of FIG. 1 with the cap releasably attached to the sump.
FIG. 20 is an isometric view of the filter cartridge of FIG. 1 with the cap removed.
Figure 21:
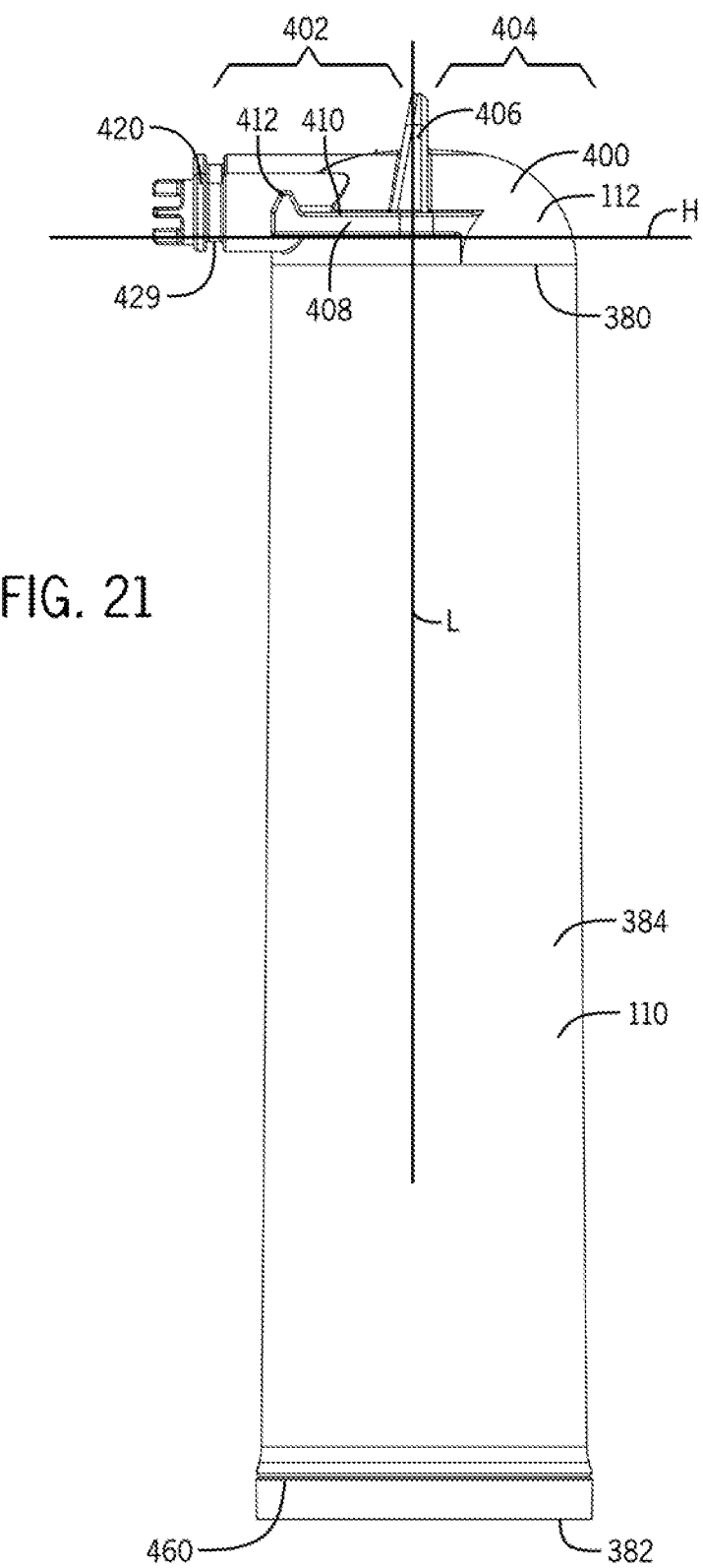
FIG. 21 is a side elevational view of the filter cartridge of FIG. 1 with the cap removed.
Figure 22:
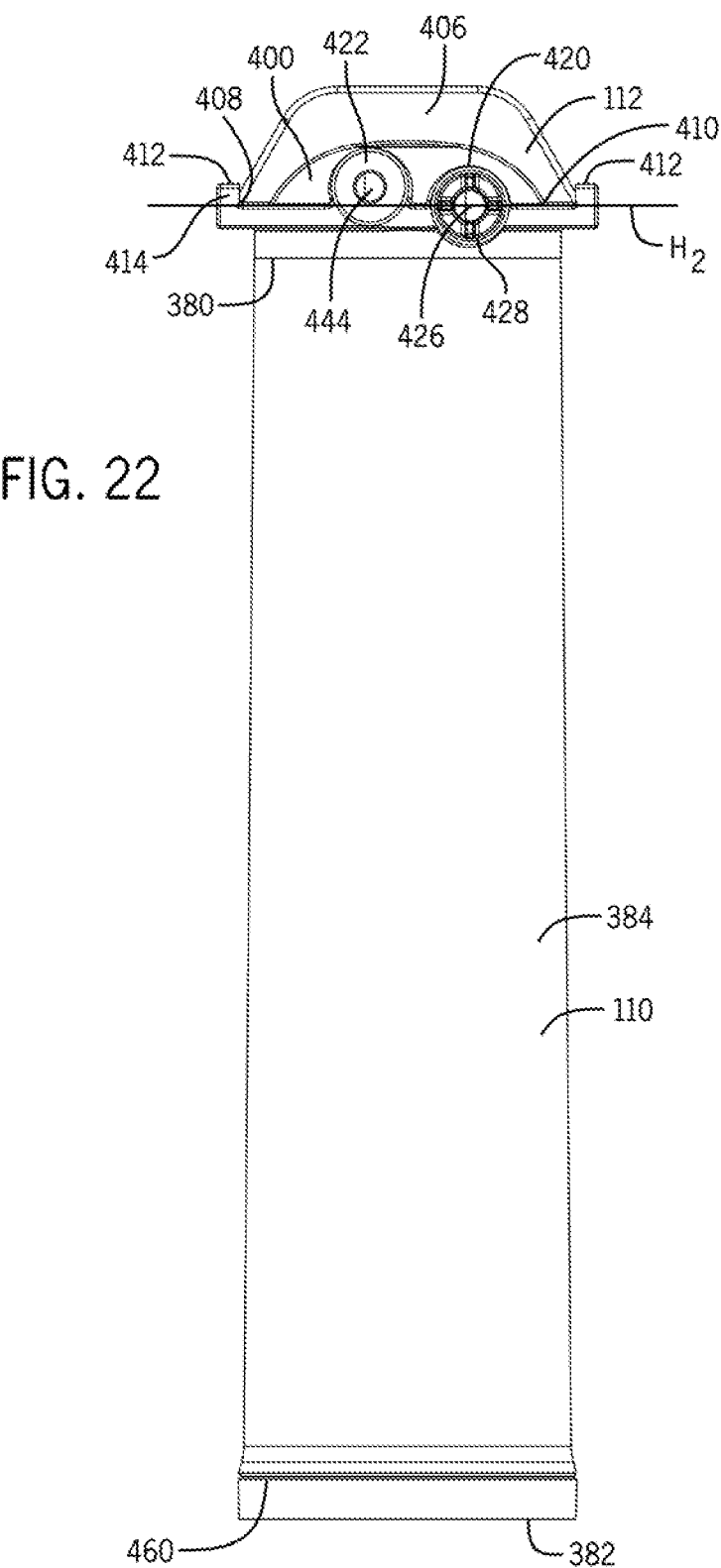
FIG. 22 is a front elevational view of the filter cartridge of FIG. 1 with the cap removed.

The end 380 of the sump 110 is closed via the cartridge head 112. In some embodiments, the cartridge head 112 is integral with the sump 110 and is not designed to be separated therefrom. As shown in FIGS. 20 and 21, the cartridge head 112 includes a domed body 400 separated into a front half 402 and a rear half 404 by a protruding strut 406. As shown in FIG. 21, the protruding strut 406 is slightly angled with respect to a longitudinal axis L formed by the housing 384 of the sump 110. Two rail members 408 extend outwardly from the front half 402 of the body 400 in parallel with a horizontal axis H that is perpendicular to the axis L. The rail members 408 are characterized by a substantially flat surface 410 that terminate at catch members 412 disposed on terminal ends of the rail members 408. The catch members 412 protrude upwardly from the surface 410 and include a substantially flat end wall 414 forming a locking surface. The locking surface is designed to interact with portions of the housing 104 to assist in locking the filter cartridge 108 into the housing 104, as explained in more detail below.

Figure 23:
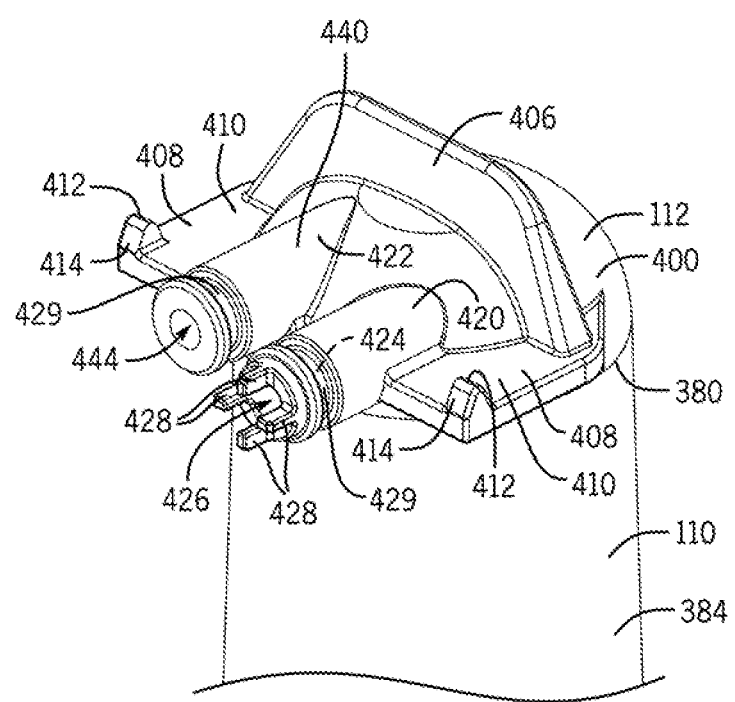
FIG. 23 is an enlarged partial isometric view of the filter cartridge of FIG. 1 with the cap removed.
Figure 24:
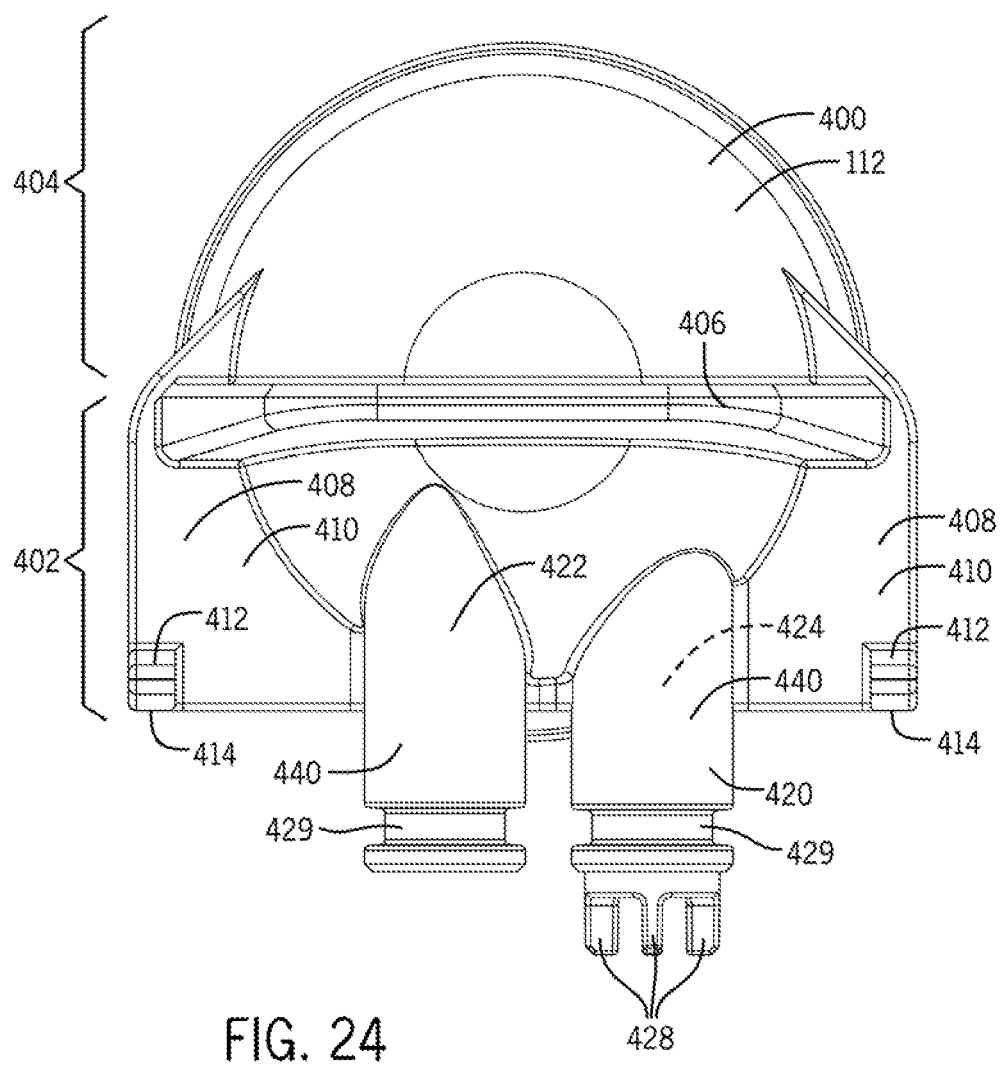
FIG. 24 is a top plan view of the filter cartridge of FIG. 1 with the cap removed.
Figure 25:
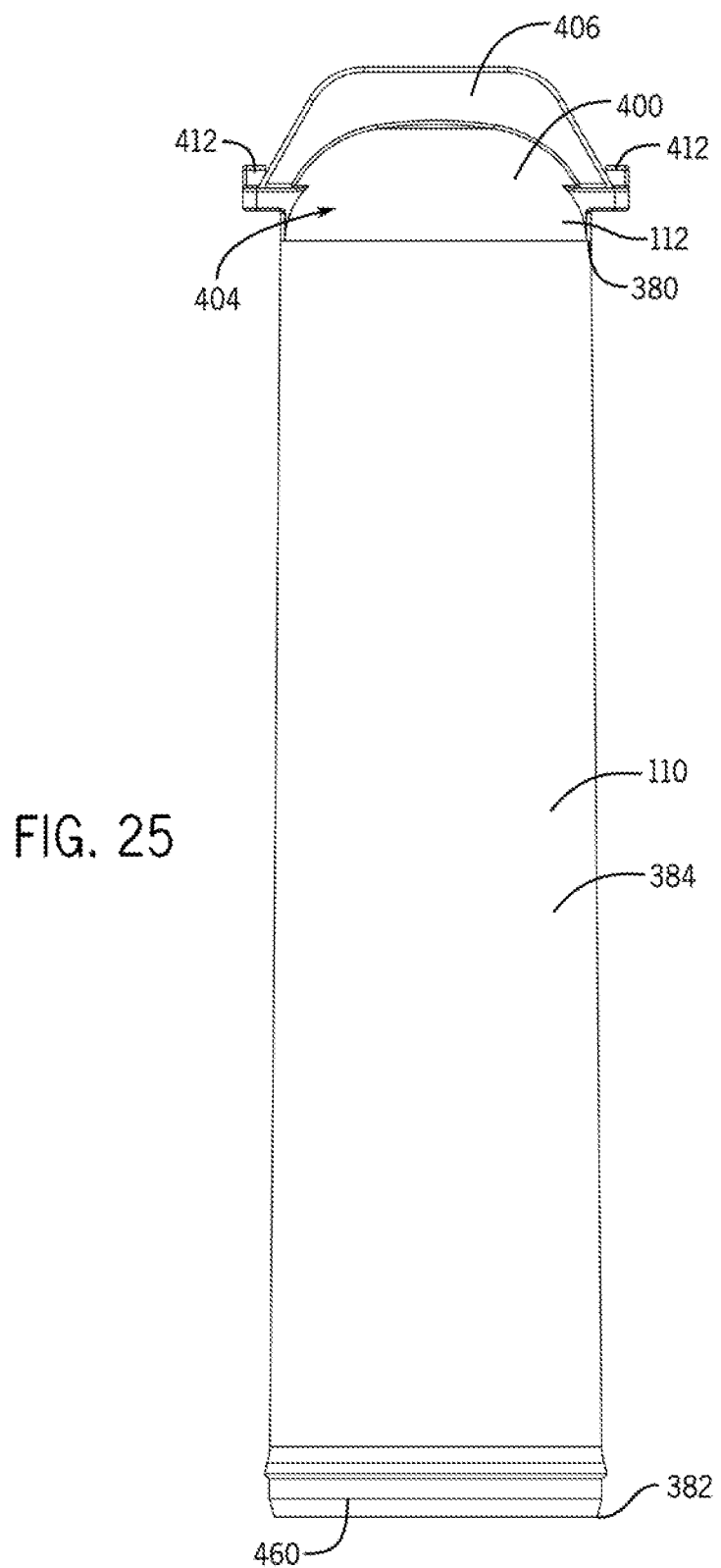
FIG. 25 is a rear plan view of the filter cartridge of FIG. 1 with the cap removed.
Figure 26:
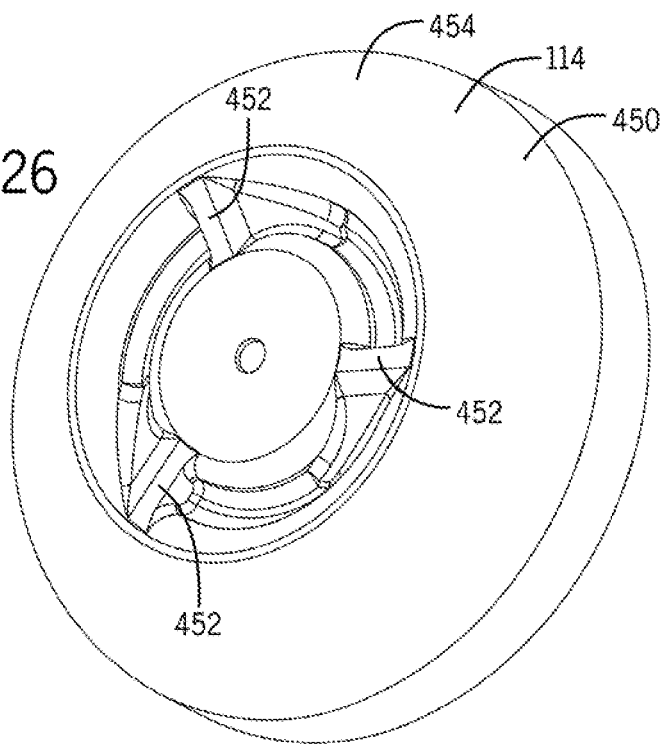
FIG. 26 is a top isometric view of the cap of FIG. 1.
Figure 27:
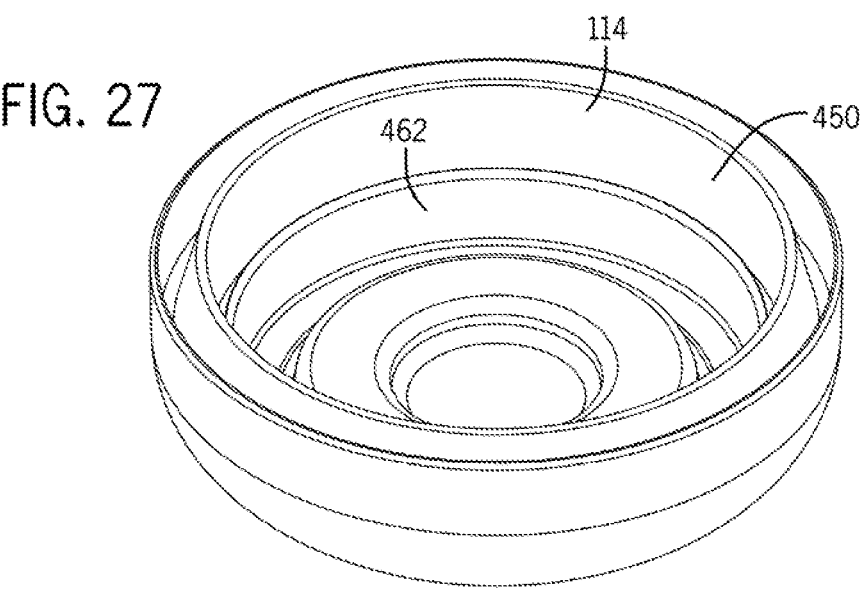
FIG. 27 is a bottom isometric view of the cap of FIG. 1.

The cartridge head 112 also includes a cylindrical inlet tube 420 and an adjacent cylindrical outlet tube 422 protruding from the front half 402 of the body 400. As shown in FIG. 23, the inlet tube 420 includes an internal valving mechanism 424 designed to allow fluid communication between water flowing from the housing 104 into the filter cartridge 108. The inlet tube 420 is a cylindrical member that has an aperture 426 surrounded by prong members 428. The prong members 428 are configured to engage and activate the valve 270 disposed within the inlet chamber 260 to control water flow through the filter manifold 102. When the prong members 428 are axially displaced, the aperture 426 is opened such that water is able to flow into the cartridge head 112. When the prong members 428 return to the position depicted in FIGS. 18-25, the aperture 426 is closed and water is unable to enter the cartridge head 122.

Figure 42:
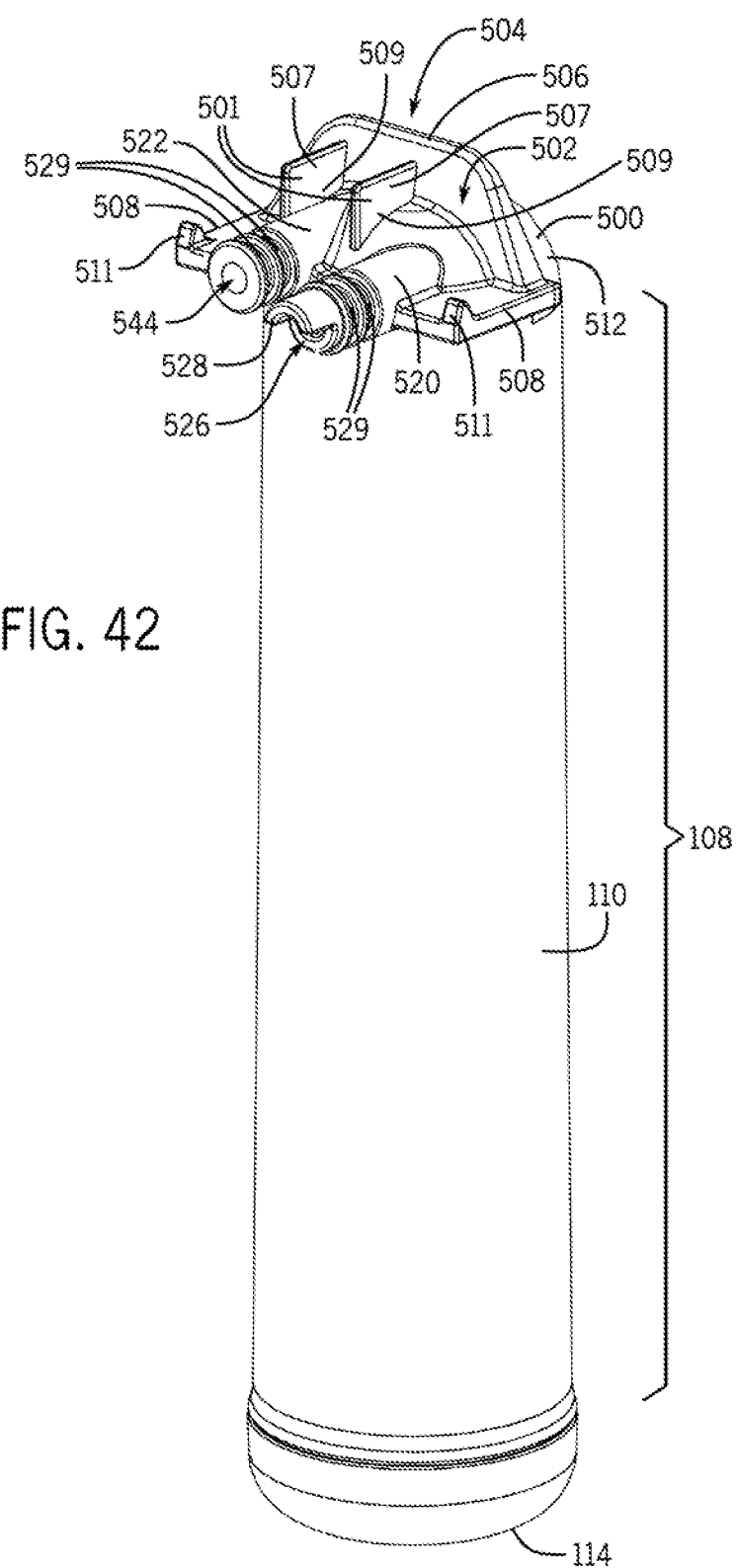
FIG. 42 is an isometric view of the filter cartridge of FIG. 1 showing an inlet tube with a semicircular feature for activating water flow into the filter cartridge head.

In some embodiments, the prong members 428 may be replaced by a single, semi-circular prong 528, as shown in FIG. 42, which is also configured to engage the valve 270 disposed within the inlet chamber 260 to control water flow through the filter manifold 102, as will be described in further detail below. It is contemplated that the prong members 428, 528 may take various different shapes and surround the aperture 426, 526 of the inlet tube 420, 520 at any suitable location that allows the cartridge 108 to engage the filter manifold 102. Thus, the prong members 428 shown in FIG. 23 may have a cylindrical shape as opposed to the rectilinear shape depicted. In addition, the semi-circular prong 528 shown in FIG. 42 may be positioned at a bottom portion of the aperture 526 as opposed to the top portion of the aperture as shown in FIG. 42. In a further embodiment, any of the prongs 428/528 may be omitted.

As depicted in FIGS. 20-24, the outlet tube 422 of the cartridge head 112 includes a cylindrical body 440 with a centrally disposed aperture 444 that allows water to flow out of the cartridge head 112. As shown in FIG. 20, the inlet tube 420 and the outlet tube 422 each include a circular recess 429 that circumscribes an outer surface of the inlet and outlet tubes 420, 422. Each circular recess 429 is configured to receive an O-ring (not shown). Thus, when the inlet tube 420 engages the inlet orifice 250 of the housing 104 and the outlet tube 422 engages the outlet orifice 252 of the housing 104, a seal is created. In some embodiments, as shown in FIG. 42, one or more circular recesses 529 may circumscribe the outer surface of the inlet and outlet tubes 520, 522 and may be configured to receive O-rings (not shown) for additional sealing.

Returning to FIG. 22, the inlet tube 420 and the outlet tube 422 are offset with respect to an axis H2, formed by the flat surface 410 of the rail members 408. The inlet tube 420 is oriented to align with the inlet orifice 250 of the housing 104 and the outlet tube 422 is positioned to align with the outlet orifice 252 of the housing 104. The offset nature of the inlet orifice 250 and outlet orifice 252 allows the width of both of the filter manifold 102 and the filter cartridge 108 to be minimized.

Now turning to FIGS. 18, 19, 26, and 27, the opposing end 382 of the sump 110 includes a removable cap 114. The cap 114 includes a circular body 450 and optionally includes one or more finger grips 452 disposed on an exterior surface 454. The cap 114 is designed to close the end 382 of the sump 110 during use of the water filtration system 100 and is designed to be removed to allow the filtration media 116 to be replaced. The finger grips 452 provide a gripping surface to facilitate removal of the cap 114.

The cap 114 may be releasably attached to the end 382 of the sump 110 via numerous attachment mechanisms. In one embodiment, the cap 114 is releasably attached to the sump 110 via snap fit using a ridge 460 circumscribing the end 382 of the sump 110 and corresponding undercut 462 disposed on an interior surface of the cap 114. In another embodiment, the cap 114 is threadingly engaged to the sump 110 via threads (not shown) that circumscribe an exterior surface of the sump 110 and corresponding grooves (not shown) formed on an interior surface of the cap 114. In a further embodiment, the cap 114 is releasably attached to the sump 110 via an interference fit. In still other embodiments, the cap 114 may be releasably attached to the sump 110 using other attachment mechanisms. Alternatively, the filter cap 114 may be permanently attached to the sump 110 via welding or other suitable attachment mechanisms.

Figure 28:
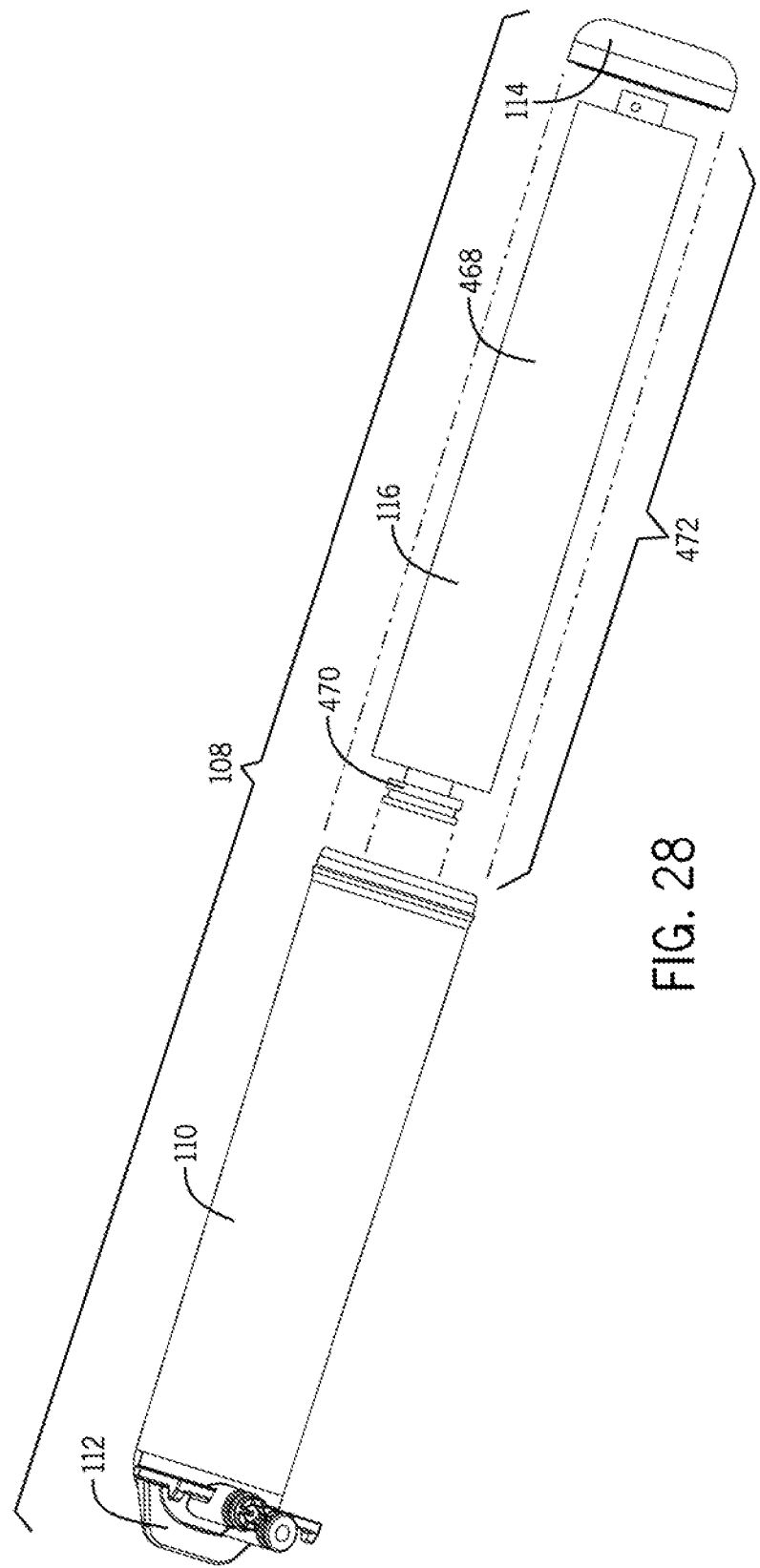
FIG. 28 is an exploded isometric view of a filter cartridge suitable for use with one type of filtration media.
Figure 29:
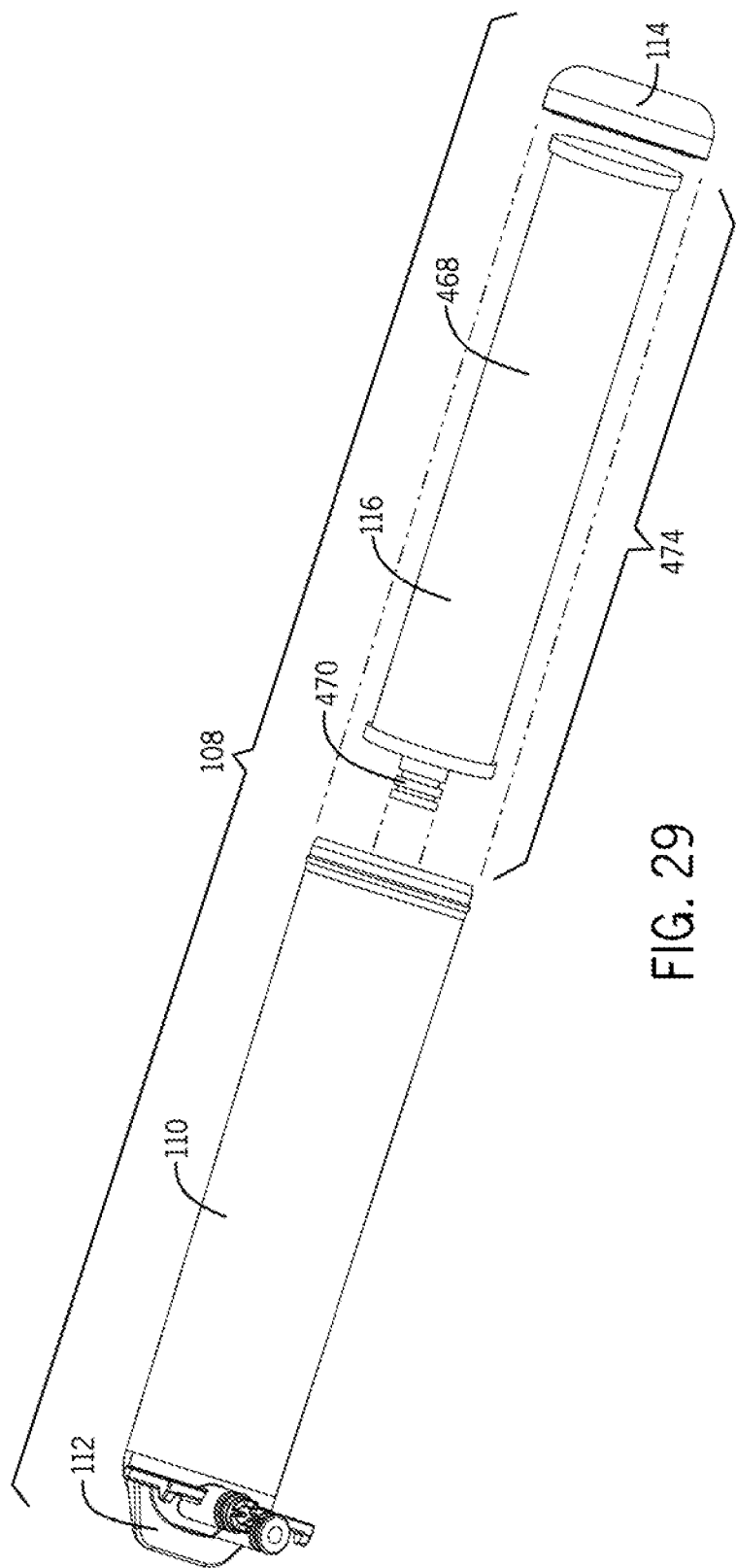
FIG. 29 is an exploded isometric view of a filter cartridge suitable for use with another type of filtration media.
Figure 30:
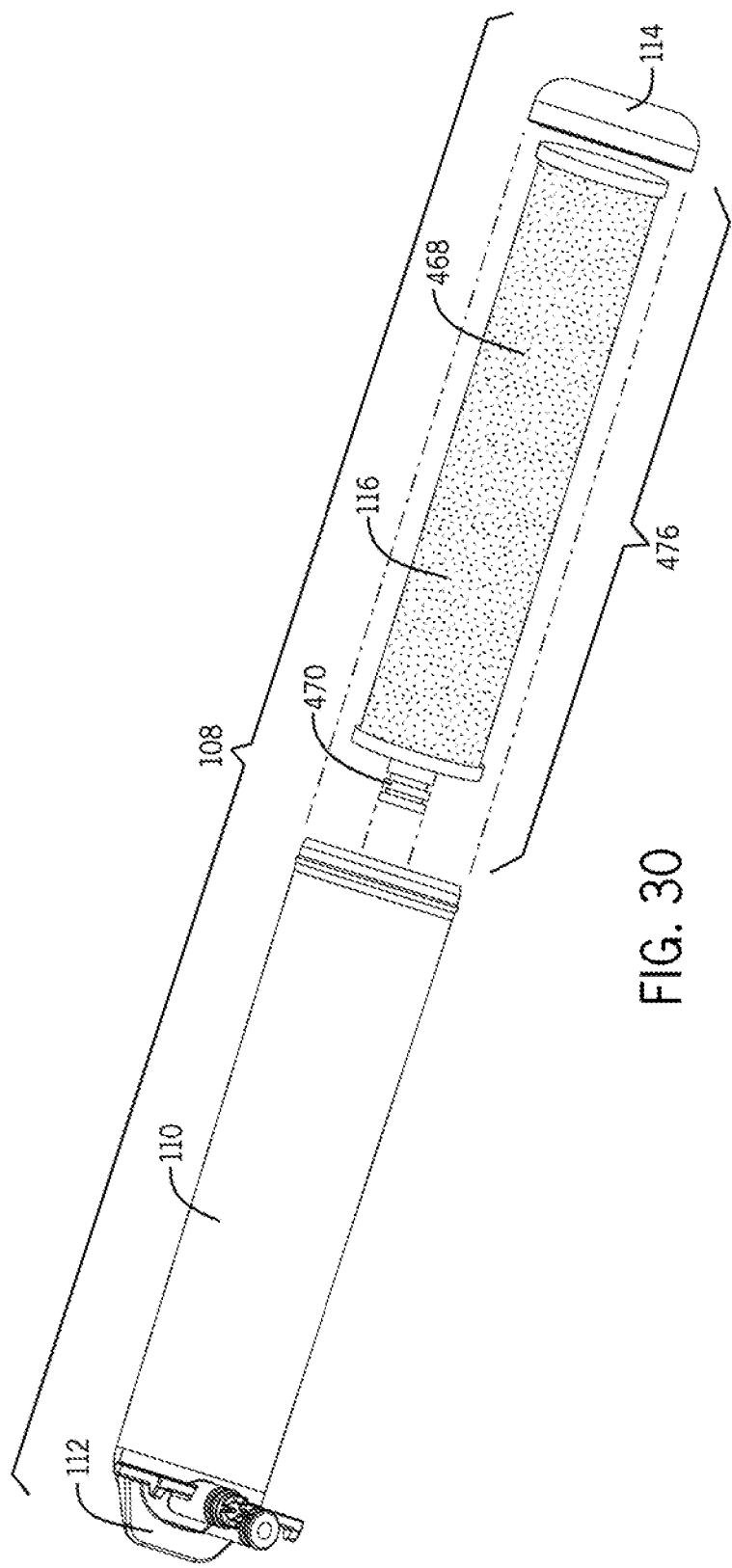
FIG. 30 is an exploded isometric view of a filter cartridge suitable for use with a different type of filtration media.

Now turning to FIGS. 28-30, the filter cartridge 108 holds replaceable filtration media 116 in an interior cavity. The filtration media 116 is designed to receive untreated water from the water feed line and remove various impurities before sending the filtered water to the supply line. The filtration media 116 is a self-contained cylindrical cartridge 468 that may be easily removed from the sump 110 and replaced. To facilitate attachment to the cartridge head 112, the filtration media 116 optionally includes an engagement mechanism 470 or a neck extending upwardly from a top surface. The engagement mechanism 470 of the filtration media 116 engages a corresponding engagement component (not shown) within the cartridge head 112 to prepare the filtration media 116 for use by creating a fluid path therebetween. One or more valving mechanisms may be contained in the cartridge 468 and/or the inlet/outlet tubes 420, 422 of the cartridge head 112.

The filtration media 116 comprises any number of filtration mechanisms suitable to filter water to the desired purity levels. In one embodiment, the filtration media 116 is a reverse osmosis membrane 472. In another embodiment, the filtration media 116 is a carbon black cartridge 474. In yet another embodiment, the filtration media 116 is a sediment cartridge 476. Other suitable filtration media 116 and cartridges 108 include those described in U.S. Patent Application Publication No. 2008/0185330, filed on Nov. 22, 2006, and U.S. Patent Application Publication No. 2007/0227959, filed on Mar. 31, 2006, both incorporated by reference in their entireties.

As shown in FIGS. 18, 19, and 28-30, in use, the filtration media 116 is installed into the filter cartridge 108 and the filter cartridge 108 is locked into the filter manifold 102 to create a fluid path through the water filtration system 100. As an initial step, the cap 114 may be rotated or otherwise removed from the sump 110 to allow access to the end 382 to install the filtration media 116. The filtration media 116 is slid upwardly into the sump 110 until the engagement mechanism 470 contacts the corresponding engagement component of the cartridge head 112. After the filtration media 116 is in communication with the cartridge head 112, the cap 114 is replaced to enclose the filtration media 116 in the sump 110. This process is repeated each time the filtration media 116 needs to be replaced. The same or different types of filtration media 116 may be utilized each time the filtration media 116 is replaced.

In another step, the filter cartridge 108 is designed to engage the filter manifold 102. To insert the filter cartridge 108 into the filter manifold 102, the cover 106 of the housing 104 is rotated upwardly as shown in FIGS. 31 and 32 to allow access to the housing 104. Once the cover 106 is opened, the filter cartridge 108 is moved parallel with respect to axis H defining a plane H (see FIG. 21), in a horizontal manner toward the housing 104 of the filter manifold 102. The inlet and outlet tubes 420, 422 are aligned with the corresponding inlet and outlet orifices 250, 252 associated with the wall 200 of the housing 104. Once coupled, internally, the prong members 428 of the inlet tube 420 axially displace the valve 270 to form a fluid path and allow water to access the filter cartridge 108 via the inlet orifice 250, which is in communication with the inlet chamber 260 (see FIG. 41).

Figure 36:
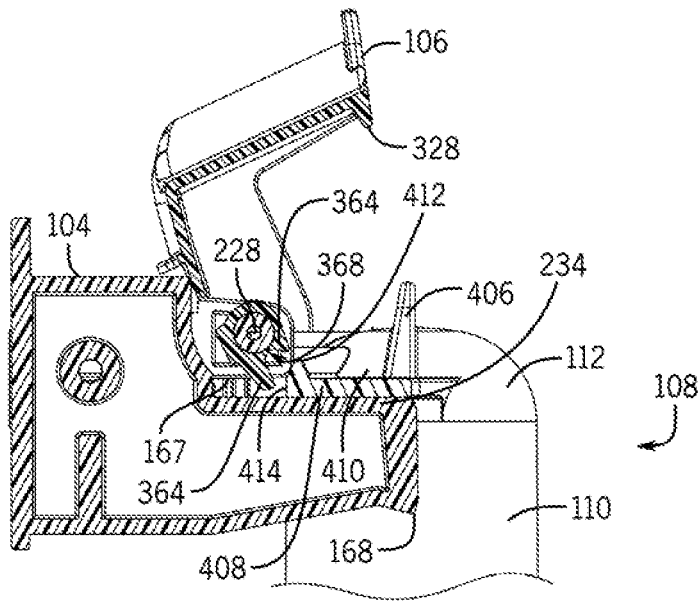
FIG. 36 is a partial cross-sectional view of the water filtration system of FIG. 1 with the cover in an open position.
Figure 37:
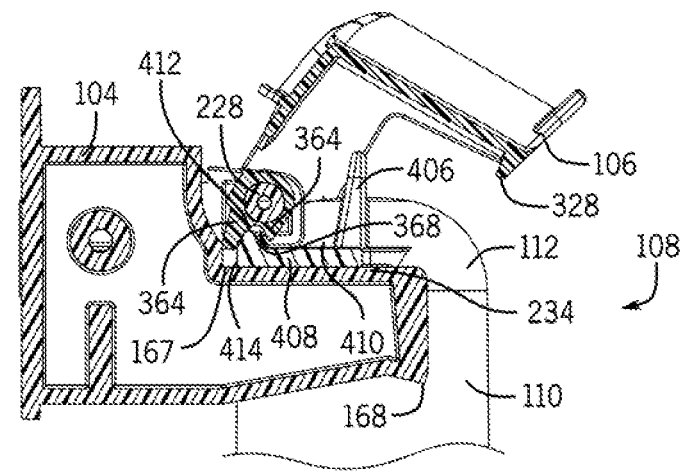
FIG. 37 is a partial cross-sectional view of the water filtration system of FIG. 1 with the cover in an intermediate position.
Figure 38:
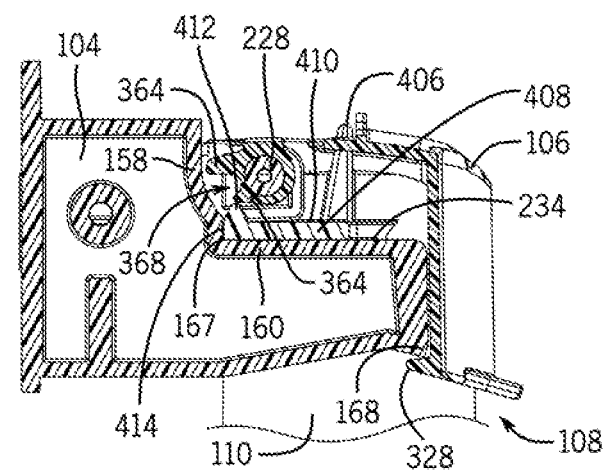
FIG. 38 is a partial cross-sectional view of the water filtration system of FIG. 1 with the cover in a closed position.

As best seen in FIGS. 36-38, as the cartridge 108 is moved toward the housing 104, the rail members 408 of the cartridge head 112 are aligned with the tracks 236 formed by the lower surfaces 232 (see FIG. 7) of the members 220 and upper surfaces 234 of the lower section 160 of the flange 154 of the housing 104. The rail members 408 slide onto the tracks 236 and continue sliding axially until the catch members 412 of the cartridge head 112 interact with the claw members 364 of the cover 106. The catch members 412 slide into the recess 368 such that the flat end wall 414 presses against the recess 368.

At the same time, the cover 106 is grasped and rotated toward a closed position in a manner shown by arrow C (see FIG. 34), which further forces the cartridge 108 toward the housing 104 via the catch members 412. Once the cover 106 is fully rotated as shown in FIGS. 35 and 38, the end wall 414 abuts a point 167 on the housing 104, which is the point where the curved section 158 intersects the lower section 160.

Figure 40:
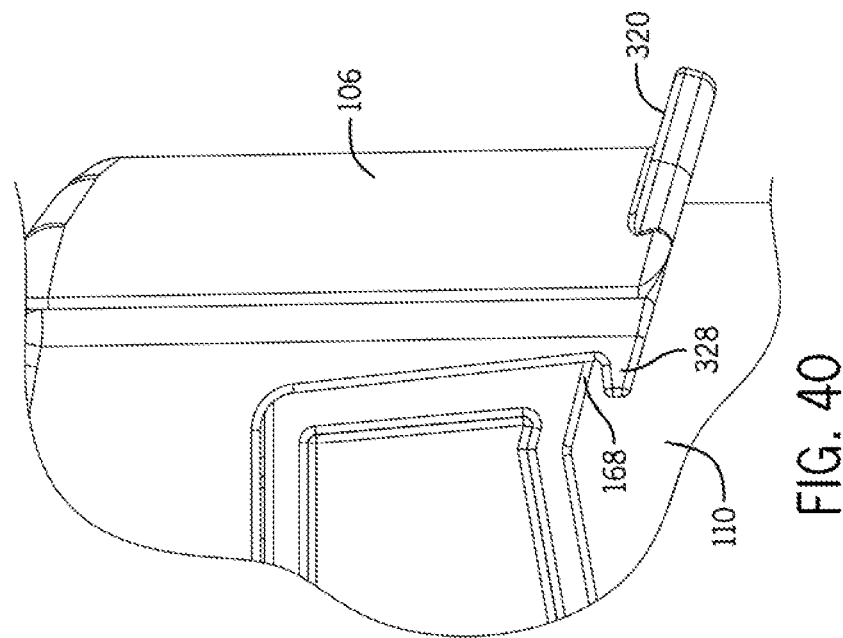
FIG. 40 is partial schematic view of the water filtration system of FIG. 1 with the cover of the housing releasably locked to the filter cartridge.
Figure 39:
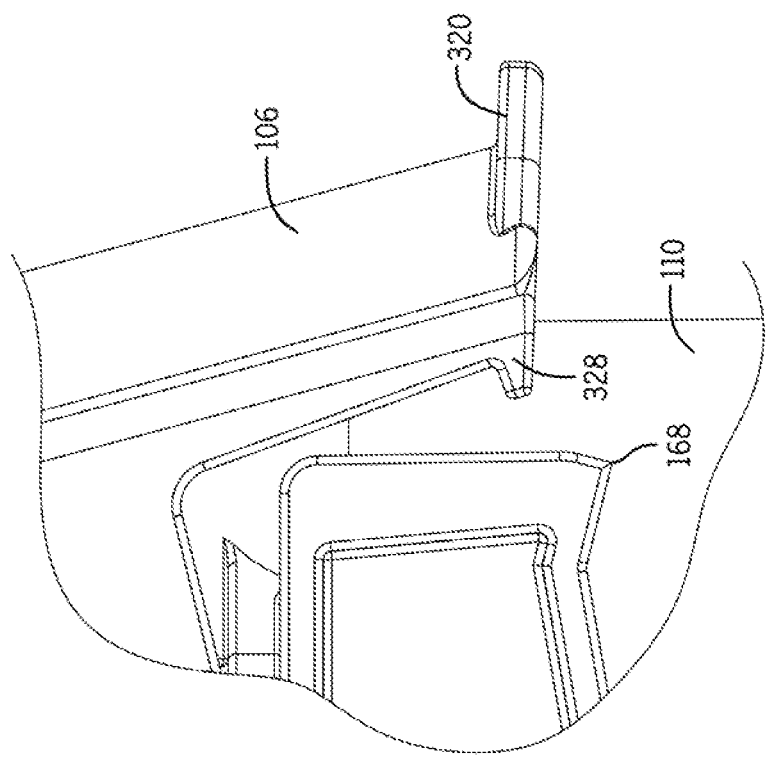
FIG. 39 is a partial schematic view of the water filtration system of FIG. 1 with the cover of the housing disengaged from the filter cartridge.

The protruding strut 406 of the cartridge head 112 rides over the interior surface of the cover 106 until being disposed adjacent the protruding wall 314 between members 316 (see FIG. 38). Additionally, the two locking ribs 328 of the cover 106 engage the detents 168 of the arm members 126a, 126b of the housing 104 (see FIGS. 39 and 40). In this locked position, the filter cartridge 108 is in fluid communication with the housing 104 and is ready for use.

In use, unfiltered water flows through the water feed line and enters the filter manifold 102 through the bore 192 extending from the housing 104. Water flows into the bore 192, through the valve 270, and into the inlet chamber 260. Water continues through the inlet chamber 260 and is directed into the filter manifold 102 via the inlet orifice 250 that is in communication with the inlet tube 420 of the cartridge head 112. Water flows through the filter cartridge 108 through the filtration media 116 and exits via the outlet tube 422. The filtered water continues through the outlet tube 422 of the filter cartridge 108 through the outlet orifice 252 and into the outlet chamber 292. The water flows through the outlet chamber 292 to one or more of the opening 294 and/or secondary opening 298. The filtered water is either directed to the water supply line to be distributed to the end user, or directed to one or more additional filter manifolds 102 during multi-stage filtering. In another instance, water may be sent to additional filtration components. For example, water may be filtered to a reverse osmosis system such as the one described in U.S. Pat. No. 8,262,910, filed on Aug. 31, 2011, and incorporated by reference in its entirety.

To change the filtration media 116 and/or the filter cartridge 108, one or more steps of the process described above are reversed. It is contemplated that the filtration media 116 alone may be replaced without removing the filter cartridge 108 from the manifold 102. To do this, the cap 114 is removed from or rotated in an opposite direction (e.g., counterclockwise) to disengage the cap 114 from the sump 110. The filtration media 116 must be dislodged from the cartridge head 112 by rotating, sliding, or otherwise disengaging the engagement mechanism 470 from the engagement component of the cartridge head 112. Once the spent filtration media 116 is finished, new replacement media 116 is added in the manner discussed previously.

To disengage the entire filter cartridge 108 from the filter manifold 102, the cover 106 of the housing 104 is rotated upwardly to allow access to the housing 104. The claw members 364 of the cover 106 may be configured to engage the catch members 412 to unseat the cartridge head 412 from the filter manifold 102. Once the cover 106 is opened, the filter cartridge 108 is slid horizontally outwardly with respect to axis H (see FIG. 21), away from the housing 104 of the filter manifold 102.

In another embodiment, as shown in FIGS. 42-47, the cartridge head 512 includes one or more fin members 501 upwardly extending from the front half 502 of the domed body 500 that are configured to be received by corresponding slots 603 (see FIG. 43) of the filter manifold 602. The cartridge head 512, filter cartridge 108, filter manifold 602 and associated components are similar to the cartridge head 112, filter cartridge 108, filter manifold 102 and associated components described with respect to FIGS. 1-41 and therefore similar reference numerals will be used to describe similar components. In addition, the cartridge head 512 and filter manifold 602 shown in FIGS. 42-47 may be configured to receive a similar cover 106 as described in FIGS. 1-41.

Figure 43:
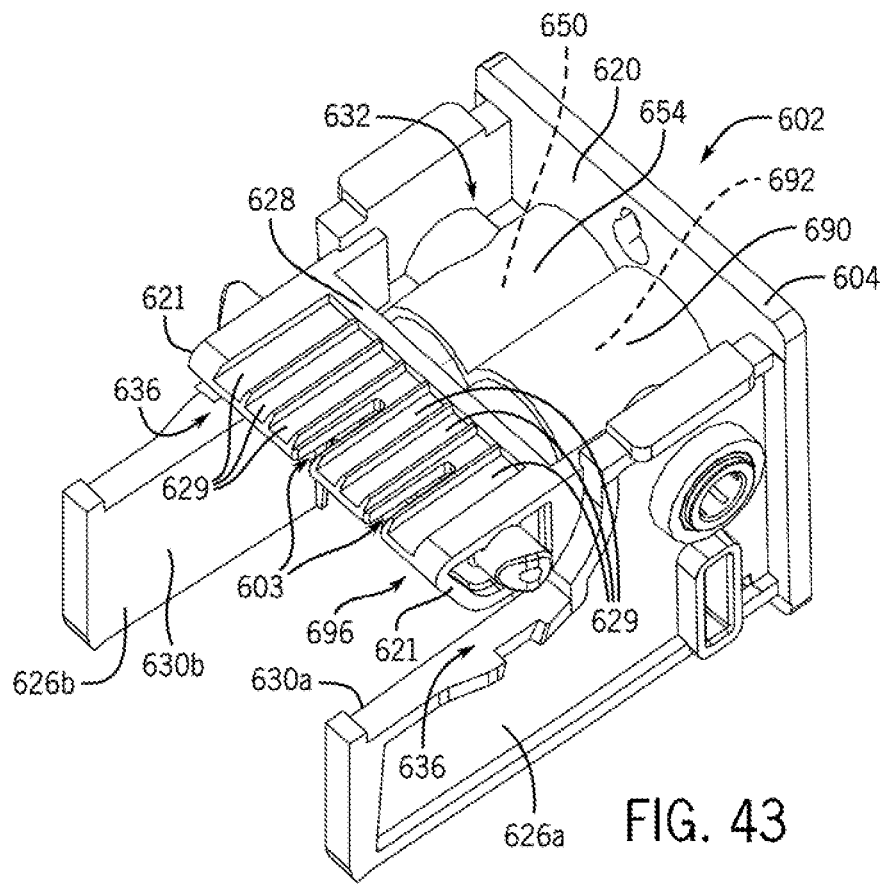
FIG. 43 is a top isometric view of another embodiment of a filter manifold showing a slotted keying feature for engaging the filter cartridge head.
Figure 44:
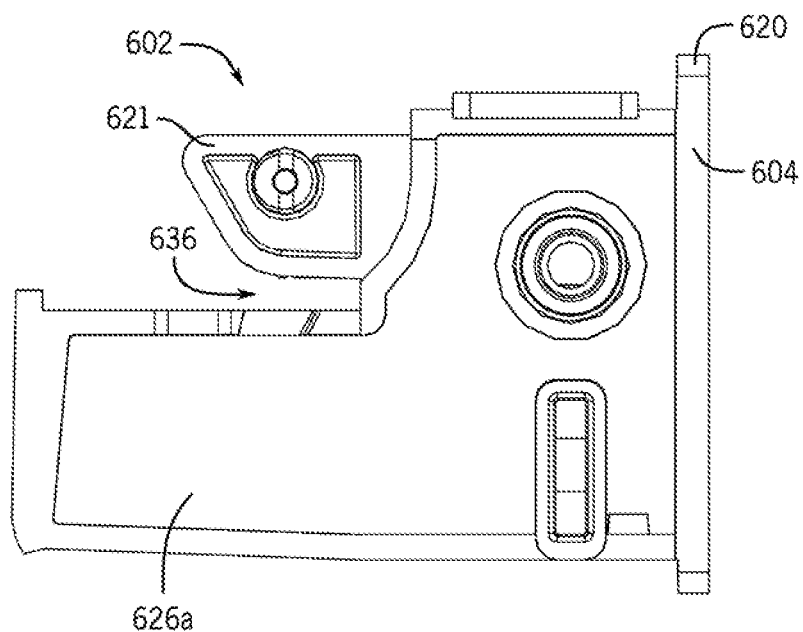
FIG. 44 is a side elevational view of the filter manifold of FIG. 43.

As shown in FIGS. 43-44, the housing 604 of the filter manifold 602 includes a bracket 620 with two opposing arm members 626a, 626b protruding outwardly therefrom. The arm members 626 are mechanically joined by a brace 628 that extends between interior surfaces 630a, 630b of the arm members 626a, 626b and divides the housing 604 into the interior (rear) section 632 and (front) receiving section 696. The interior (rear) section 632 includes the cylindrical housing 654 that extends between the brace 628 and the bracket 620. The cylindrical housing 654 defines the inlet chamber 650 that receives the inlet tube 520 of the cartridge head 512. The interior (rear) section 632 further includes the cylindrical housing 690 that also extends between the brace 628 and the bracket 620 of the filter manifold 602. The cylindrical housing 690 defines the outlet chamber 692 that receives the outlet tube 522 of the cartridge head 512.

With continued reference to FIGS. 43-44, the brace 628 further includes two members 621 that extend outwardly from the brace 628. A plurality of corrugated channels 629 also extend outwardly from the brace 628 in the receiving section 696 of the filter manifold 602. The plurality of corrugated channels 629 may extend between the members 621 and/or may be integrally formed with the members 621 of the brace 628. One or more slots 603 may be provided in the plurality of corrugated channels 629 for receiving the fin members 501 of the cartridge head 512. In the embodiment shown in FIG. 43, eight corrugated channels 629 are depicted with slots 603 provided in two of the eight channels 629. However, it is contemplated that the slots 603 may be provided in any one of the channels 629 and the slots 603 may be provided in different shapes (e.g., semi-circular recesses, triangular recesses, etc.). In addition, more than eight channels 629 or less than eight channels 629 may be provided. It is further provided that the slots 603 may be provided independent of the channels 629 (e.g., the channels 629 may be omitted).

Returning to FIG. 42, the fin members 501 may be rigid and extend upwardly from the front half 502 of the domed body 500 and extend outwardly from the protruding strut 506 that separates the cartridge head into the front half 502 and the rear half 504. A top portion 507 of each fin member 501 may be substantially rectangular in shape in order to engage the slots 603 within the plurality of corrugated channels 629. A bottom portion 509 of each fin member 501 may be arc shaped to match the curvature of the domed body 500. Thus, the fin members 501 may be integrally formed with the domed body 500 of the cartridge head 512. However, in some embodiments, the fin members 501 may be coupled to the domed body 500 using any suitable fastening technique.

Still referring to FIG. 42, one or more fin members 501 may be provided on the domed body 500 of the cartridge head 512. In the embodiment shown in FIG. 42, two fin members 501 are shown. One of the fin members 501 is positioned between the inlet tube 520 and the outlet tube 522, and the other fin member 501 is positioned to the left of the outlet tube 522. However, it is contemplated that the fin members 501 may be spaced and positioned in various locations on the front half 502 of the domed body 500. In one non-limiting example, one fin member 501 could be positioned between the inlet tube 520 and the outlet tube 522, and the other fin member 501 may be positioned to the right of the inlet tube 520. In another non-limiting example, one fin member 501 may be positioned to the left of the outlet tube 522 and the other fin member 501 may be positioned to the right of the inlet tube 520. In addition, more than two fin members 501 or less than two fin members 501 may be provided and may include various shapes depending on the shape of the corresponding slots 603 of the filter manifold 602.

By providing various combinations of the slot 603 positions and spacing between the fin members 501, a particular type of filter cartridge 108 media (e.g., RO membrane) may be designed to only engage the filter manifold 602 having corresponding slots 603. This assures that the correct filter cartridge 108 is being provided to the filter manifold 602. Additionally, the appropriately spaced slots 603 and corresponding spaced fin members 501 can provide the user with a simple alignment mechanism while inserting the filter cartridge 108 into the filter manifold 602.

Figure 45:
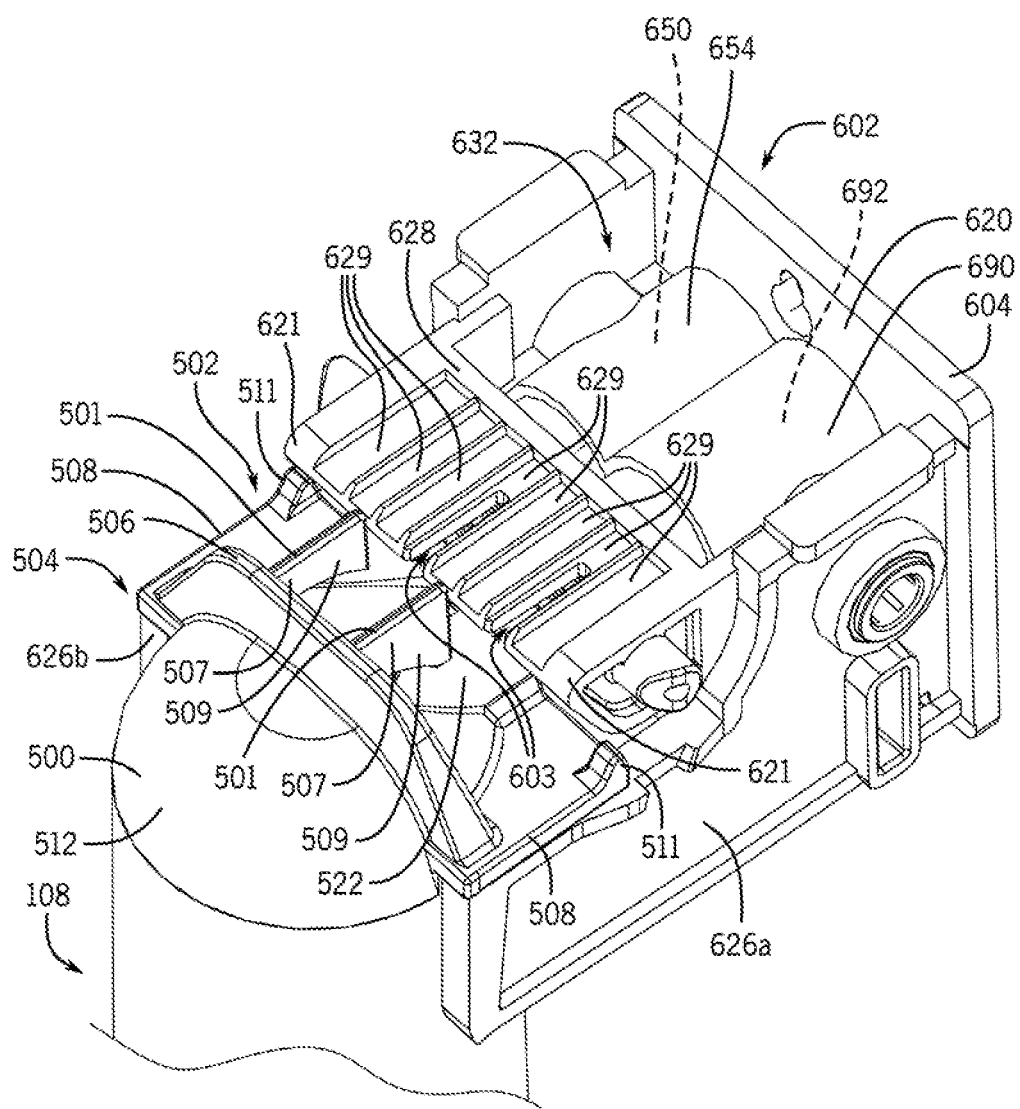
FIG. 45 is a top isometric view of the filter cartridge head and the filter manifold showing the slotted keying feature in an unmatched position.

For example, as shown in FIG. 45, the fin members 501 do not align with the slots 603 of the filter manifold 602, thereby indicating the incorrect filter cartridge 108 is being inserted into the filter manifold 602. In contrast, as shown in FIG. 46, the fin members 501 are properly aligned with the slots 603 of the filter manifold 602, thereby indicating the correct filter cartridge 108 is being inserted into the filter manifold 602.

Figure 46:
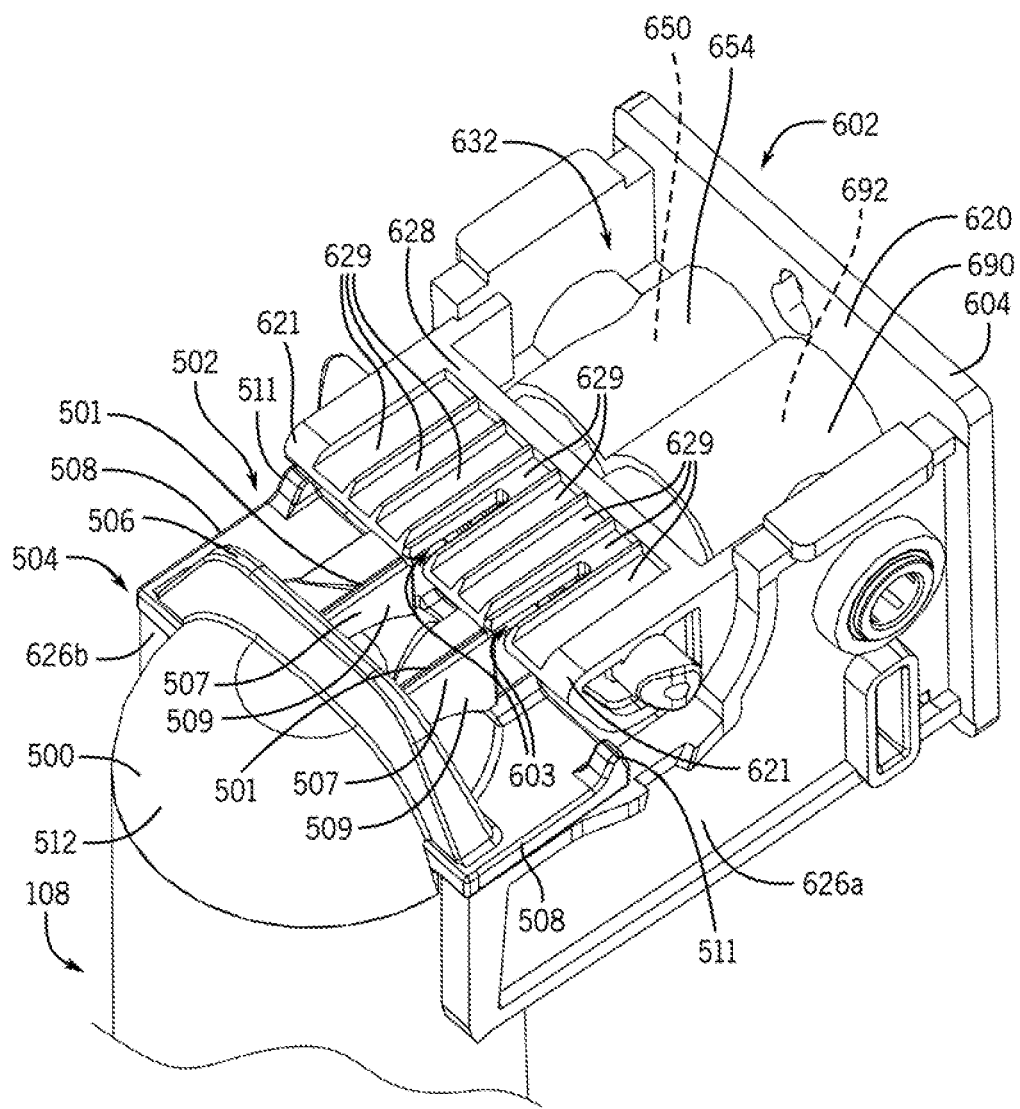
FIG. 46 is a top isometric view of the filter cartridge head and the filter manifold showing the slotted keying feature in a matched position prior to engagement.
Figure 47:
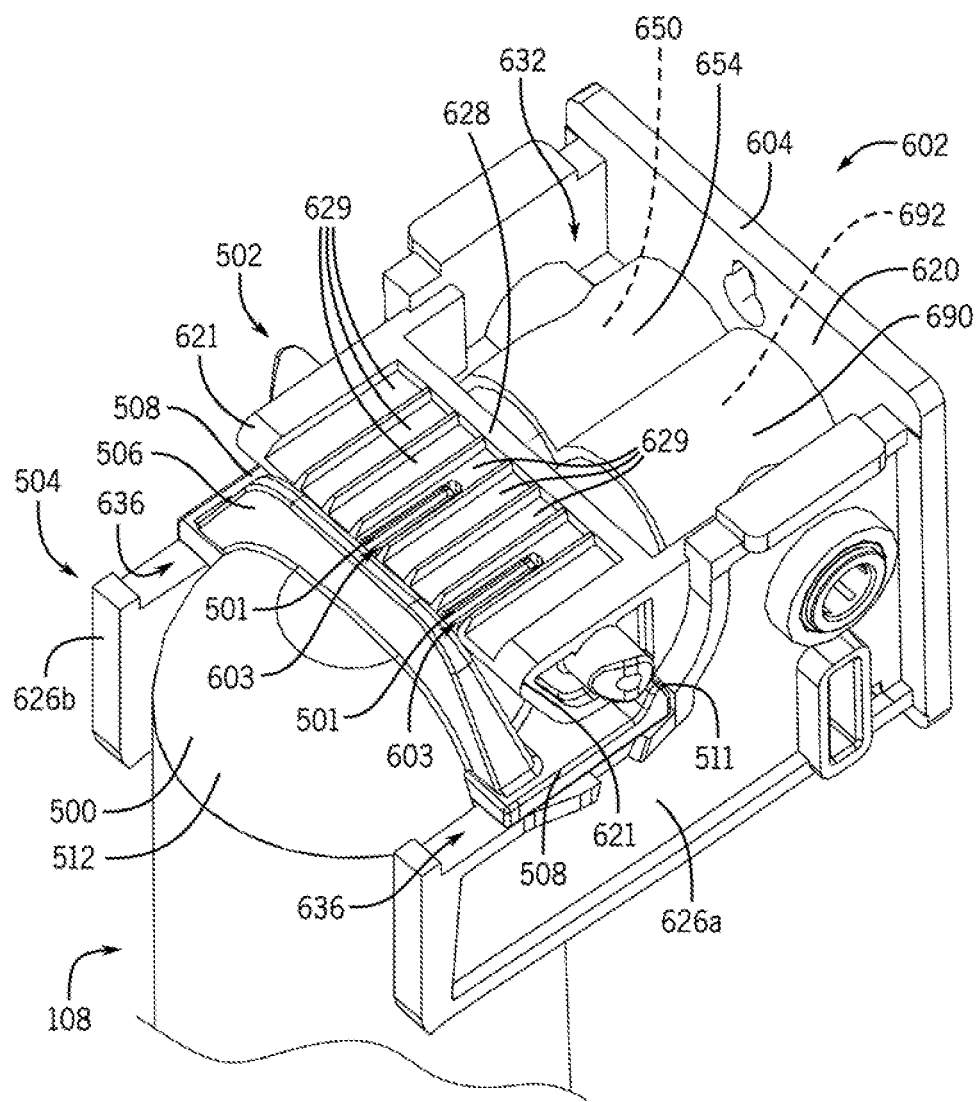
FIG. 47 is a top isometric view of the filter cartridge head and the filter manifold showing the slotted keying feature in the matched position.

In use, the filter cartridge 108 is designed to engage the filter manifold 602, as shown in FIG. 46. To insert the filter cartridge 108 into the filter manifold 602, the cover (not shown) is rotated upwardly to allow access to the housing 604. Once the cover is opened, the filter cartridge 108 is moved parallel with respect to axis H (see FIG. 21), in a horizontal manner toward the housing 604 of the filter manifold 602. The fin members 501 of the filter cartridge 108 are aligned with the corresponding slots 603 of the filter manifold 602. In turn, the inlet and outlet tubes 520, 522 are aligned with the corresponding inlet and outlet orifices (not shown) associated with the inlet chamber 650 and the outlet chamber 692 or the cylindrical housings 654, 690. Once coupled, internally, the semi-circular prong 528 of the inlet tube 520 axially displaces the valve 270 to form a fluid path and allows water to access the filter cartridge 108 via the inlet orifice, which is in communication with the inlet chamber 560.

As shown in FIG. 46, as the cartridge 108 is moved toward the housing 604, the rail members 508 of the cartridge head 512 are aligned with the tracks 636 of the filter manifold housing 604. The rail members 508 slide onto the tracks 636 and continue sliding axially until the catch members 511 of the cartridge head 512 interact with the claw members of the cover (not shown). At the same time, the fin members 501 axially engage the corresponding slots 603. The cover (not shown) is then grasped and rotated toward a closed position to force the cartridge 108 toward the housing 604 via the catch members 511 into the locked position, as previously described with respect to FIGS. 39 and 40.

Figure 48:
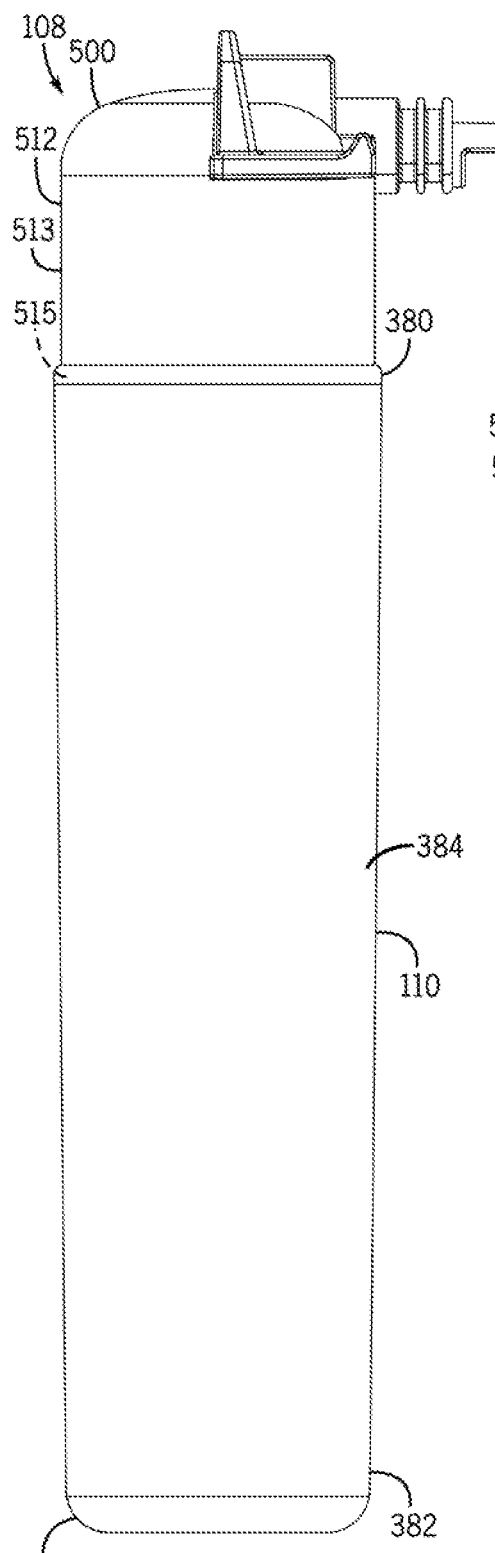
FIG. 48 is a side elevational view of another filter cartridge showing the filter cartridge head attached to the sump at one end and closed at an opposite end.
Figure 49:
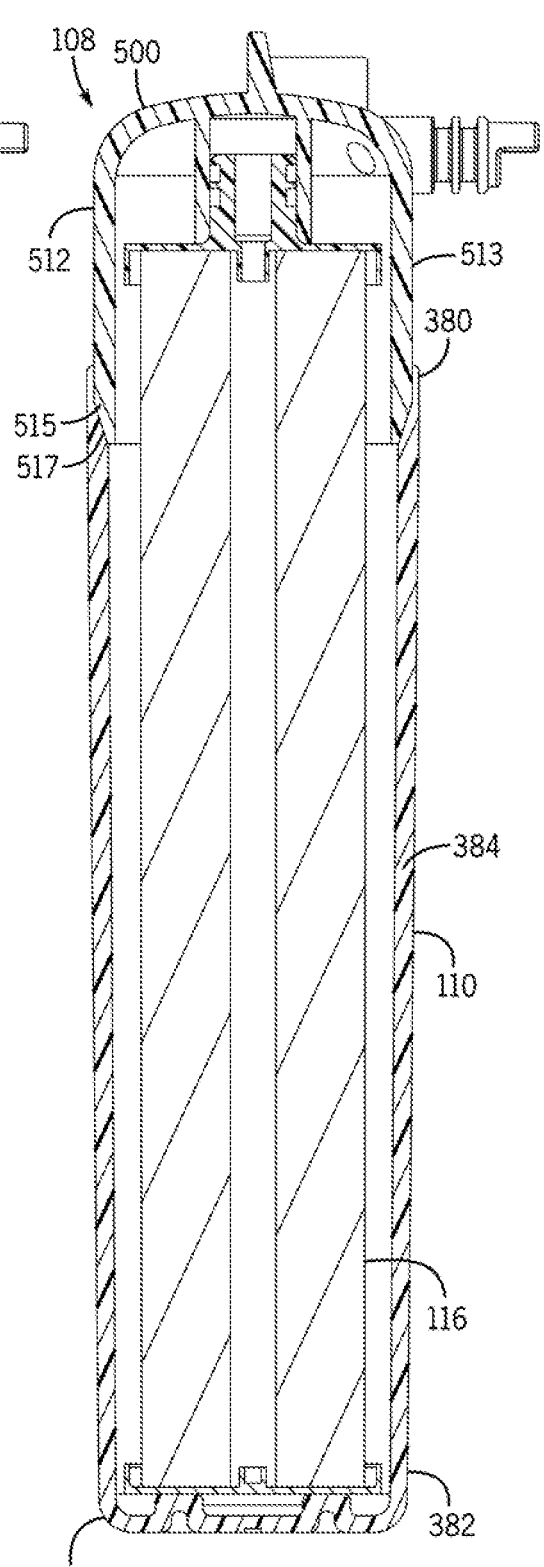
FIG. 49 is a cross sectional view of the filter cartridge of FIG. 48.

In another embodiment, as shown in FIGS. 48-49, the filter cartridge 108 includes the sump 110 having the cartridge head 512 at one end 380 and a cap portion 514 at an opposing end 382. The cap portion 514 may be integrally formed with the end portion 382 of the sump 110. The cartridge head 512 is defined by a cylindrical side wall 513 that extends downwardly from the domed body 500. A lower portion 515 of the cylindrical side wall 513 tapers inwardly toward the filtration media 116. Thus, the lower portion 515 of the cylindrical side wall 513 is configured to be received by a recess 517 formed within the end portion 380 of the cylindrical housing 384 of the sump 110. In some embodiments, the end portion 380 of the sump 110 is welded to the lower portion 515 of the cylindrical side wall 513 of the cartridge head 512 and is not designed to be separated therefrom.

Figure 50:
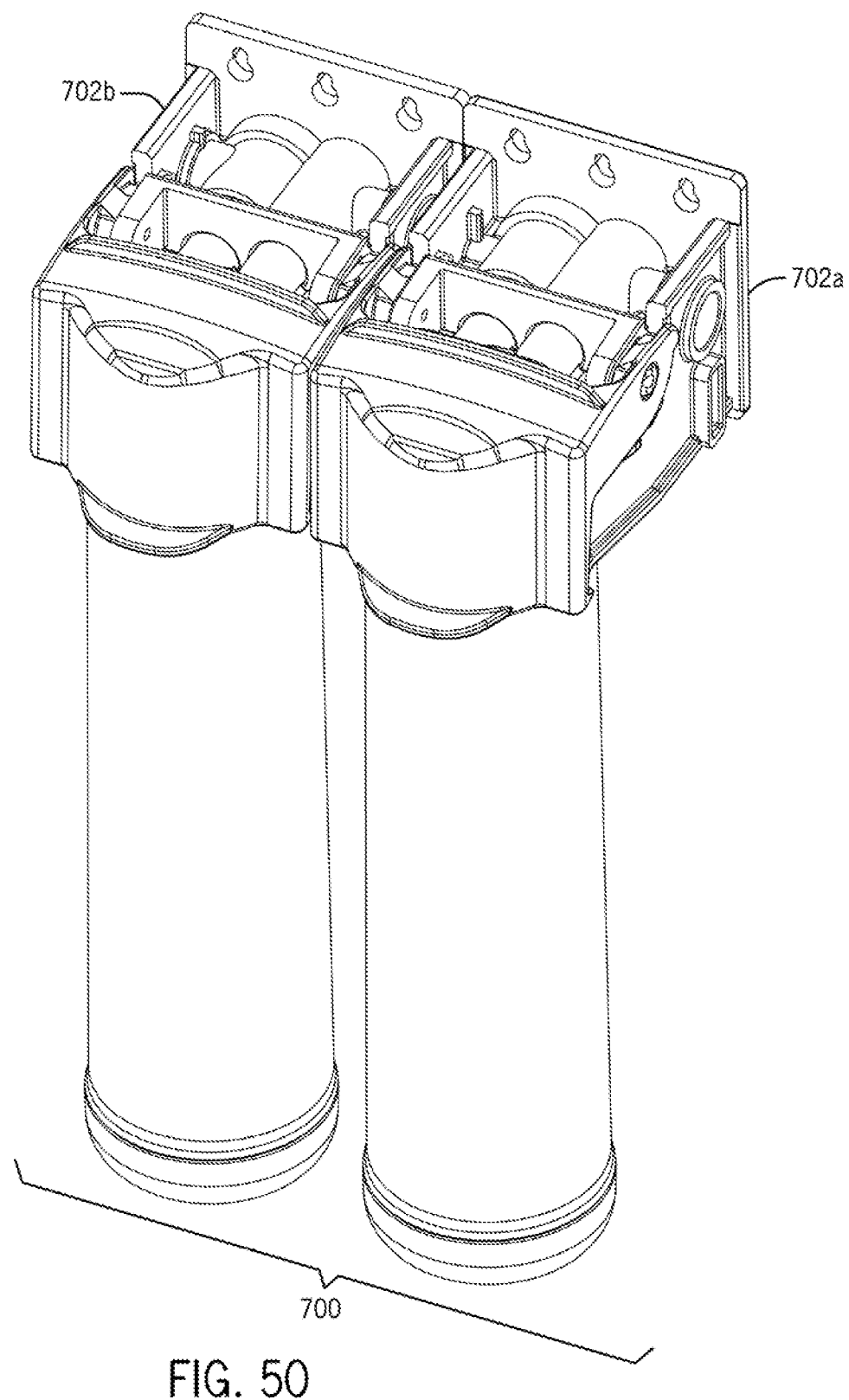
FIG. 50 is an isometric view of another embodiment of a water filtration system including two filter cartridges coupled to two filter manifolds.
Figure 51:
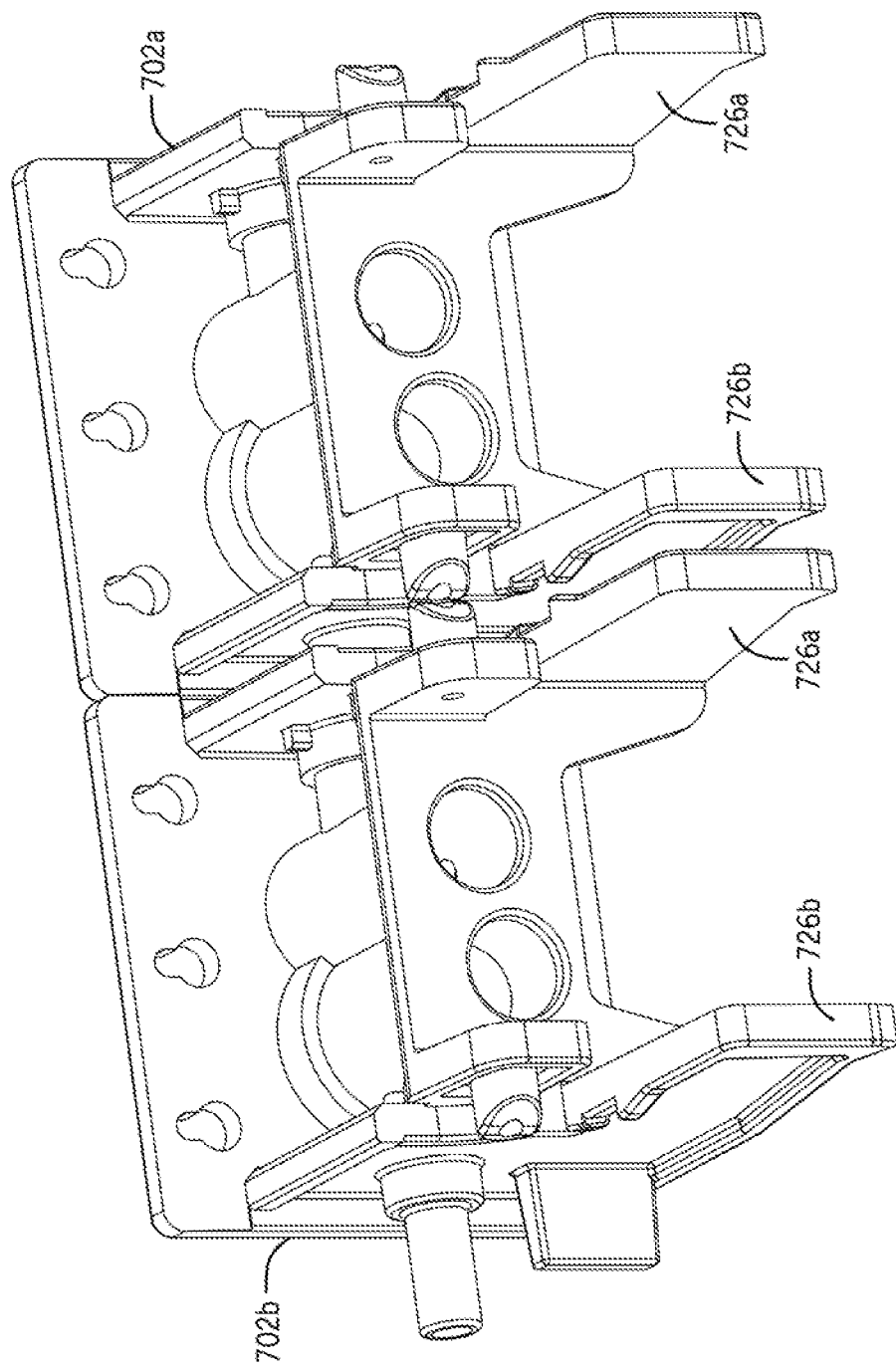
FIG. 51 is an isometric view of the filter manifolds of FIG. 50.
Figure 52:
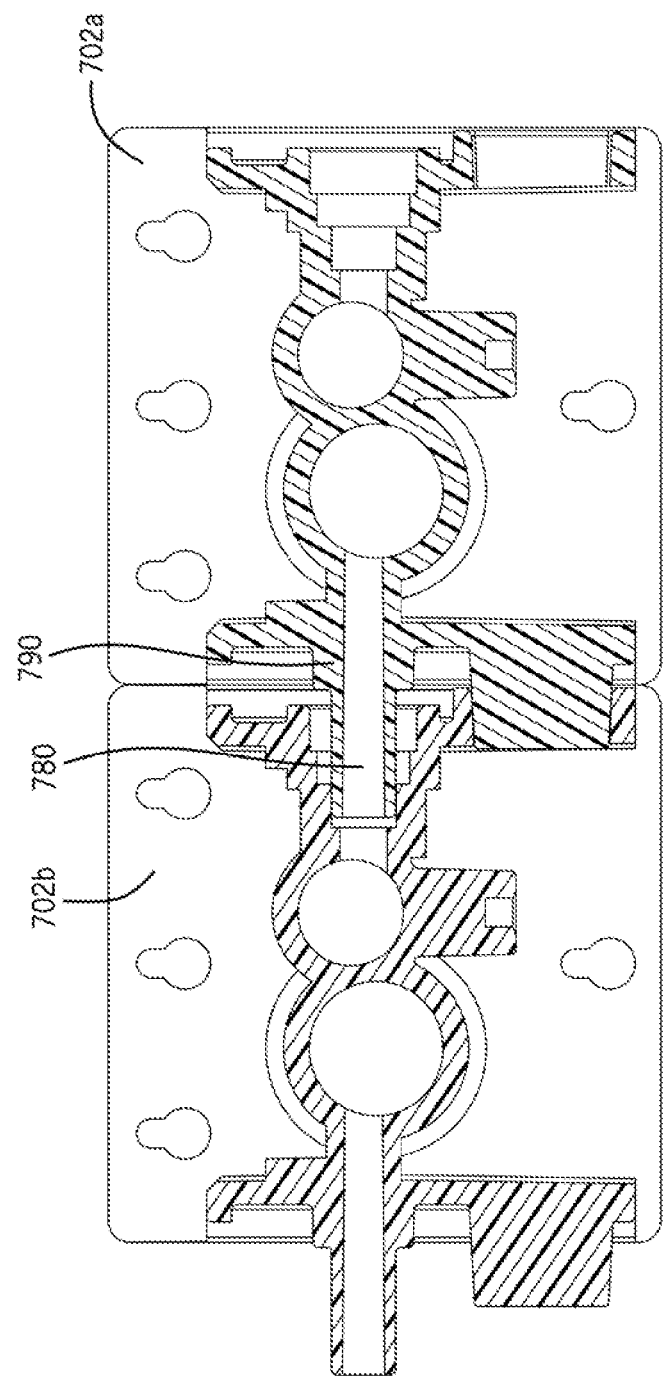
FIG. 52 is a partial cross-sectional schematic view of the water filtration system of FIG. 50 showing one filter cartridge coupled to the second filter cartridge.

In another embodiment shown in FIGS. 50-52, two filter manifolds 702a, 702b are attached to create a multi-stage water filtration system 700. To attach one filter manifold 702a to a second filter manifold 702b, a cylindrical protrusion 790 (see FIG. 52) of arm member 726b slides into a circular duct 780 of the arm member 726a to provide a fluid path between the filter manifolds 702a, 702b.

The filter manifolds 702 are modular in this manner so that numerous manifolds 702 can be attached to each other to create the multi-stage filtration system 700. In one instance, one or more filtration stages may be utilized to correspond to various filtration properties of the water being filtered. In particular, numerous filtration media 116 types may be utilized in conjunction with each other in the multi-stage system 700 to further refine the filtration properties. In other instances, the same filtration media 116 is utilized in the filter cartridges 108.

It will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

The invention claimed is:

1. A modular water filtration system, comprising:
    a filter manifold including:
        a bracket having a body, a first arm member, and a second arm member, the first arm member and the second arm member extending outwardly and horizontally away from the body;
        a brace coupled to the first arm member and the second arm member and extending at least partially therebetween; and
        a slot provided in the brace;
    a filter cartridge including a cartridge head and a fin member protruding upwardly from the cartridge head, the fin member sized to be received within the slot of the filter manifold,
        wherein the filter cartridge is designed to engage the filter manifold through a horizontal force when the fin member is aligned with the slot.

2. The modular water filtration system of claim 1, the filter cartridge further including an inlet tube and an outlet tube protruding horizontally from the cartridge head, and wherein the fin member extends at least partially above the inlet tube and the outlet tube.

3. The modular water filtration system of claim 2, wherein the fin member is positioned and located between the inlet tube and the outlet tube, adjacent to the outlet tube and a first outer edge of the cartridge head, or adjacent to the inlet tube and a second outer edge of the cartridge head.

4. The modular water filtration system of claim 1, wherein the slot is positioned and located between the first arm member and the second arm member.

5. The modular water filtration system of claim 1, wherein the first arm member and the second arm member define a receiving section of the filter manifold that is adapted to receive the cartridge head of the filter cartridge.

6. The modular water filtration system of claim 1, wherein the fin member is provided as a substantially rectangularly-shaped prism and the slot is provided as a substantially rectangularly-shaped recess.

7. The modular water filtration system of claim 1, wherein the brace of the filter manifold further includes a channel disposed thereon, and wherein the slot is provided within the channel.

8. A modular water filtration system, comprising:
a first filter manifold including:
   a housing;
   a first slot member extending in a substantially horizontal direction, the first slot member positioned and located within the housing; and
   a cover rotatably coupled to the housing, the cover including locking ribs protruding from a body of the cover; and
a filter cartridge including a cartridge head and a first fin protruding upwardly from the cartridge head;
   wherein the shape of the first fin corresponds to the shape of the first slot member such that the first fin can be received in the first slot member, and the filter cartridge is designed to engage the first filter manifold through a horizontal force when the first fin is aligned with the first slot member; and
   wherein the cover engages the cartridge head as the cartridge head moves towards the housing of the first filter manifold and the locking ribs lock the filter cartridge to the first filter manifold.

9. The modular water filtration system of claim 8, wherein the filter cartridge further includes catch members that protrude upwardly from a surface of the cartridge head, and wherein the catch members engage the locking ribs when the filter cartridge is received in the first filter manifold.

10. The modular water filtration system of claim 8, wherein the cartridge head of the filter cartridge further includes a second fin, the housing of the first filter manifold further includes a second slot member, and wherein the filter cartridge is adapted to engage the first filter manifold via the horizontal force when the second fin is aligned with the second slot member.

11. The modular water filtration system of claim 8, wherein the housing of the first filter manifold further includes two members extending outwardly and horizontally away from the housing, the two members defining a receiving area, and wherein a plurality of channels are positioned and located between the two members and within the receiving area.

12. The modular water filtration system of claim 11, wherein the cartridge head of the filter cartridge further includes a second fin, the housing of the first filter manifold further includes a second slot member, wherein the first slot member is disposed within a first channel of the plurality of channels and the second slot member is disposed within a second channel of the plurality of channels, and wherein at least one additional channel of the plurality of channels is positioned and located between the first channel and the second channel.

13. The modular water filtration system of claim 8, wherein the housing of the first filter manifold further includes a plurality of channels extending horizontally within the housing, and wherein the first slot member is disposed in a first channel of the plurality of channels.

14. The modular water filtration system of claim 8, wherein a second filter manifold is provided and the first filter manifold is in fluid communication with the second filter manifold.

15. A modular water filtration system, comprising:
a filter manifold including:
   a housing including a body extending in a first direction, a first elongated member and a second elongated member extending outwardly from the body in a second direction, and wherein the first elongated member and the second elongated member define a receiving area of the housing therebetween;
   an inlet and an outlet positioned and located within the receiving area, the inlet and the outlet extending from the housing substantially in the second direction;
   a plurality of channels positioned and located proximate to the inlet and the outlet, each channel of the plurality of channels extending substantially in the second direction away from the body of the housing and into the receiving area; and
   a first slot positioned and located in a first channel of the plurality of channels, the first slot extending into the channel substantially in the second direction and towards the housing; and
a filter cartridge designed to be received by the receiving area of the filter manifold when inserted into the filter manifold in substantially the second direction.

16. The modular water filtration system of claim 15, the plurality of channels of the filter manifold further including a second slot, wherein each channel of the plurality of channels are substantially parallel to each other, and wherein the first slot and the second slot are separated by at least one channel.

17. The modular water filtration system of claim 15, wherein the plurality of channels of the filter manifold includes a second slot and a third slot, and wherein the first, second, and third slots are proximate to each other, or any of the first, second, and third slots are separated by at least one channel.

18. The modular water filtration system of claim 15, wherein the filter cartridge further includes a fin extending away from the filter cartridge in the second direction, and wherein the fin is received into the first slot when the filter cartridge is inserted into the receiving area.

19. The modular water filtration system of claim 15, wherein a brace extends from the first elongated member and towards the second elongated member in a third direction, and wherein the plurality of channels is provided on the brace.

20. The modular water filtration system of claim 15, wherein the inlet and the outlet of the filter manifold are offset relative to each other in the first direction, and wherein the filter cartridge is designed to couple to the inlet and the outlet.

* * * * *